(12) United States Patent
Newman

(10) Patent No.: US 10,591,614 B1
(45) Date of Patent: *Mar. 17, 2020

(54) DETECTOR ARRAY FOR LOCATING RADIOACTIVE SOURCES IN THREE DIMENSIONS

(71) Applicant: David Edward Newman, Poway, CA (US)

(72) Inventor: David Edward Newman, Poway, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/569,767

(22) Filed: Sep. 13, 2019

Related U.S. Application Data

(63) Continuation of application No. 16/258,654, filed on Jan. 27, 2019, now Pat. No. 10,416,318.

(60) Provisional application No. 62/725,871, filed on Aug. 31, 2018, provisional application No. 62/726,295, filed on Sep. 2, 2018, provisional application No. 62/787,694, filed on Jan. 2, 2019.

(51) Int. Cl.
| | | |
|---|---|---|
| *G01T 1/169* | (2006.01) | |
| *G01T 1/29* | (2006.01) | |
| *G01T 1/20* | (2006.01) | |
| *G01T 3/06* | (2006.01) | |
| *G01T 1/167* | (2006.01) | |
| *G01T 1/204* | (2006.01) | |
| *G01T 3/00* | (2006.01) | |

(52) U.S. Cl.
CPC .............. *G01T 1/167* (2013.01); *G01T 1/204* (2013.01); *G01T 1/2008* (2013.01); *G01T 3/008* (2013.01); *G01T 3/06* (2013.01)

(58) Field of Classification Search
CPC ....... G01T 1/167; G01T 1/2008; G01T 1/204; G01T 3/008; G01T 3/06
USPC .......................................................... 250/394
See application file for complete search history.

(56) References Cited

U.S. PATENT DOCUMENTS

| | | | | |
|---|---|---|---|---|
| 4,037,105 | A * | 7/1977 | Laurer | ..................... G01T 1/202 250/367 |
| 5,665,970 | A * | 9/1997 | Kronenberg | ............... G01T 1/18 250/336.1 |
| 5,880,469 | A | 3/1999 | Miller | |
| 6,392,236 | B1 | 5/2002 | Maekawa | |
| 6,566,657 | B2 | 5/2003 | Odom | |
| 7,745,800 | B1 | 6/2010 | McGinnis | |

(Continued)

*Primary Examiner* — Taeho Jo

(57) ABSTRACT

A large-area directional radiation detection system useful in detecting shielded radiological weapons may include a large number of prism-shaped detectors stacked in a two-dimensional array of particle detectors in which alternate detectors are displaced frontward and rearward in, for example, a checkerboard-type arrangement of detectors. If a source of radiation is in front of the array, the frontward detectors act as collimators for the rearward detectors, thereby producing a narrow detection peak among the rearward detectors. The lateral position of the detection peak indicates the lateral position of the source, and the width of the detection peak indicates the distance of the source from the detector array, thereby providing a three-dimensional determination of the source location. The high detection efficiency and large solid angle of the detector array enable rapid detection of even well-shielded threat sources at substantial distances, while simultaneously determining the positions of the detected sources.

12 Claims, 21 Drawing Sheets

(56) References Cited

U.S. PATENT DOCUMENTS

| | | |
|---|---|---|
| 8,030,617 B2 | 10/2011 | Enghardt |
| 8,143,586 B2 | 3/2012 | Inbar |
| 9,733,367 B1 | 8/2017 | Derzon |
| 9,864,074 B1* | 1/2018 | Newman ............... G01T 1/2907 |
| 9,958,561 B2 | 5/2018 | Bellinger |
| 2003/0226971 A1 | 12/2003 | Chandross |
| 2005/0055174 A1* | 3/2005 | David .................. A61B 6/4258 |
| | | 702/152 |
| 2006/0284094 A1* | 12/2006 | Inbar ................... G01V 5/0075 |
| | | 250/359.1 |
| 2008/0191140 A1 | 8/2008 | McDevitt |
| 2009/0026371 A1* | 1/2009 | Bolotnikov ............. G01T 1/241 |
| | | 250/336.1 |
| 2009/0166549 A1 | 7/2009 | Czirr |
| 2010/0006769 A1* | 1/2010 | Kraft ..................... G01T 1/167 |
| | | 250/370.11 |
| 2010/0038550 A1* | 2/2010 | DeVito ................ G01V 5/0008 |
| | | 250/370.11 |
| 2010/0090097 A1* | 4/2010 | Koltick ..................... G01T 1/00 |
| | | 250/251 |
| 2010/0090115 A1 | 4/2010 | Lerch |
| 2010/0258734 A1 | 10/2010 | McCormick |
| 2011/0101230 A1 | 5/2011 | Inbar |
| 2011/0186739 A1* | 8/2011 | Foland ................ G01V 5/0008 |
| | | 250/360.1 |
| 2011/0198510 A1* | 8/2011 | Neustadter ........... G01T 1/2907 |
| | | 250/394 |
| 2013/0335796 A1* | 12/2013 | Rosen ................ H04N 1/00827 |
| | | 359/30 |
| 2014/0299777 A1* | 10/2014 | Oleinik ................ G01T 1/2002 |
| | | 250/366 |
| 2014/0361190 A1* | 12/2014 | Willis ................... G01T 1/2907 |
| | | 250/394 |
| 2015/0301203 A1 | 10/2015 | Lennert |
| 2018/0136344 A1 | 5/2018 | Nelson |
| 2018/0172853 A1* | 6/2018 | Newman ................... G01T 3/06 |
| 2019/0094390 A1* | 3/2019 | Polf ........................ G01T 1/202 |

* cited by examiner

DETECTOR ARRAY FOR LOCATING RADIOACTIVE SOURCES IN THREE DIMENSIONS

CROSS REFERENCE TO RELATED APPLICATIONS

This application is a continuation of U.S. patent application Ser. No. 16/258,654 filed Jan. 27, 2019, which claims the benefit of U.S. Provisional Patent Application No. 62/725,871 filed on Aug. 31, 2018, and U.S. Provisional Patent Application No. 62/726,295 filed on Sep. 2, 2018, and U.S. Provisional Patent Application No. 62/787,694 filed on Jan. 2, 2019, the entire disclosures of which are incorporated by reference as part of the specification of this application.

FIELD OF THE INVENTION

The present invention relates generally to detecting a radiation source. More particularly, the present invention is directed in one exemplary aspect to a large-area directional radiation detection system that determines the location of the radiation source.

BACKGROUND

The U.S. Congress has ordered that all cargo entering the country must be inspected for clandestine radiological and nuclear materials. Unfortunately, this is still not feasible. Although threat materials emit radiation (principally gamma rays and/or neutrons), sufficient shielding can greatly reduce the amount of escaping radiation. In addition, natural background radiation (cosmic rays and radioactive materials in the environment) further complicate detection. In the short time allocated for an entry scan at a shipping port (typically less than 2 minutes and often less than 1 minute), current detectors cannot detect a well-shielded nuclear weapon.

Advanced detectors with large solid angle acceptance and high detection efficiency are needed. In addition, detectors are needed that localize a source of radiation, preferably in three dimensions. Most backgrounds produce a broad uniform distribution of radiation. Therefore, a detector is needed that can distinguish a clandestine source from backgrounds according to particles coming from a single location.

What is needed is an advanced detector or detector array capable of efficiently detecting even a well-shielded source, separating neutrons and gamma rays of various energies, and determining the location of the source in three dimensions. Preferably the detection and localization may be completed rapidly and automatically, without using expensive or rare materials, and preferably at low cost.

SUMMARY

Disclosed herein is a detector array for locating a radioactive source, comprising at least 40 detectors configured to detect particles from the radioactive source, each detector being prism-shaped and oriented parallel to a central axis that runs centrally from the back to the front of the detector array, wherein said at least 40 detectors are arranged in a checkerboard pattern of frontward detectors and rearward detectors, wherein the front surface of each rearward detector is rearwardly offset from the front surface of one or more adjacent frontward detectors by an offset distance, wherein the offset distance is 1 to 3 times the thickness of each of said at least 40 detectors, and wherein the thickness of each of said at least 40 detectors is 1 to 3 times the average interaction distance of the particles therein, and a processor configured to be communicatively coupled to said at least 40 detectors and further configured to determine a front-versus-back position of the radioactive source by comparing a frontward detection peak associated with the frontward detectors to a rearward detection peak associated with the rearward detectors, and further configured to determine the lateral position of the radioactive source relative to the detector array and the distance of the radioactive source from the detector array.

These and other embodiments are described in further detail with reference to the figures and accompanying detailed description as provided below.

DETAILED DESCRIPTION OF INVENTION

Figure 1:
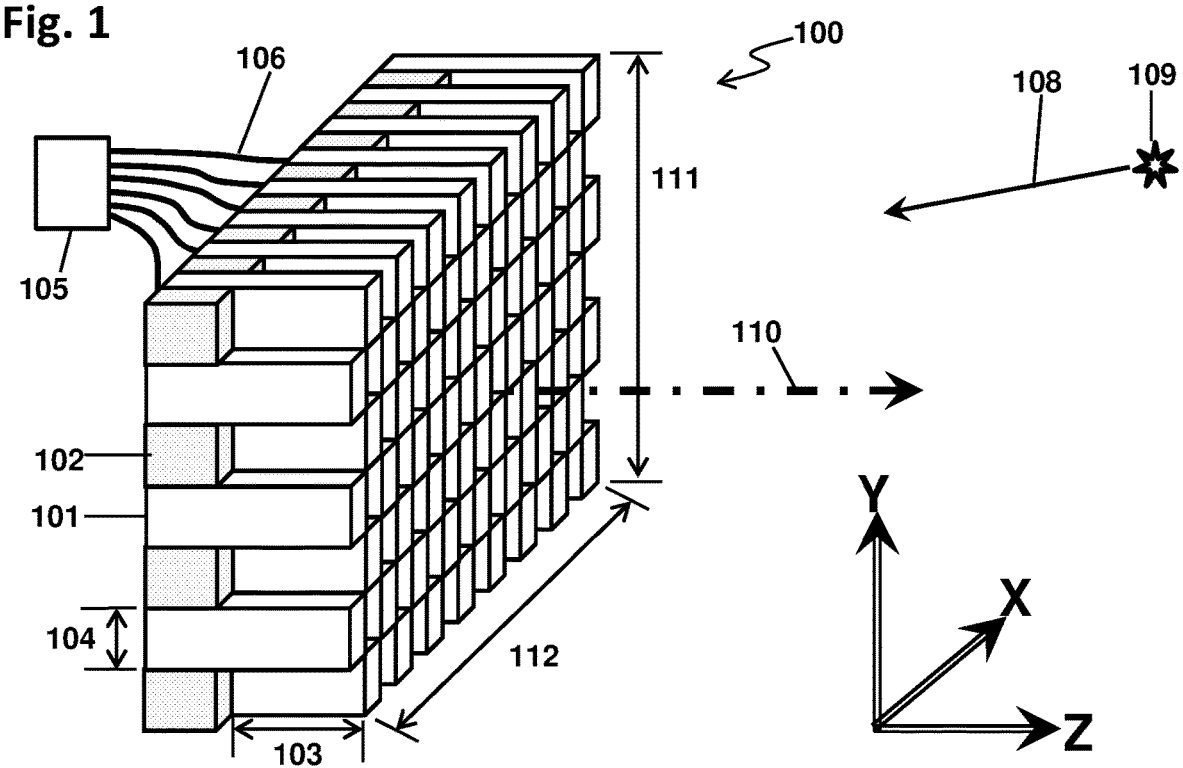
FIG. 1 is a perspective sketch of an exemplary detector array including frontward and rearward detectors, according to some embodiments.

In the following description, reference is made to the accompanying drawings in which it is shown by way of illustration specific embodiments in which the invention can be practiced. Not all of the described components are necessarily drawn to scale in order to emphasize certain features and to better facilitate the reader's conception of the disclosed embodiments. It is to be understood that other embodiments can be used and structural changes can be made without departing from the scope of the embodiments of disclosed herein.

Disclosed herein is an array of detectors (the "detector array") for detection and localization of nuclear and radiological weapons and their radioactive components, as well as other radioactive sources ("sources") that are to be located. Each detector may be a prism-shaped form configured to detect gamma rays or neutrons or both (the "particles") from the source and responsively transmit signals such as electrical pulses to a processor which is configured to determine the source location or parameters thereof. The source location parameters may include, without limitation, the lateral coordinates of the source and/or the distance of the source from the detector array and/or an angle of the source relative to the detector array and/or the front-versus-back position of the source. In some embodiments, the detector array may include no passive shields or collimators. Each detector may be shaped as a prism with an elongation direction that is parallel to the back-to-front or longitudinal direction of the detector array. The detectors may include "frontward" detectors interleaved with "rearward" detectors, wherein the front surface of each frontward detector is offset toward the front of the detector array, relative to the front surface of each adjacent rearward detector. Likewise, the front surface of each rearward detector is recessed toward the back, relative to the front surfaces of the adjacent frontward detectors. The "offset distance" is the distance between the front surfaces of adjacent frontward and rearward detectors. The "thickness" of a body is its smallest dimension. The "central axis" is a vector that runs from the back to the front of the detector array and is centered in both lateral directions. The "source angle" is the angle between the central axis and a vector toward the source.

In some embodiments, the frontward and rearward detectors may be stacked or assembled face-to-face in a two-dimensional wall-like rectangular array having two lateral dimensions (such as the "X" and "Y" directions in a Cartesian coordinate system), while the back-to-front or longitudinal direction (the "Z" direction) is perpendicular to the two lateral directions. The array may have a checkerboard pattern, wherein in some embodiments, the "white" squares represent frontward detectors and the "black" squares represent rearward detectors, while in other embodiments, the "white" squares represent rearward detectors and the "black" squares represent frontward detectors; other patterns are presented below. The detector array may be arranged in rows and columns along the two lateral dimensions. In some embodiments, the detector array may include at least 20 frontward and 20 rearward detectors (at least 40 in all), and may have at least 5 rows and at least 8 columns of detectors. The detector array may be flat ("planar") or curved ("arc-shaped") as viewed from the top (such as along the Y axis). Whether the detector array is curved or flat, the longitudinal direction is the offset direction of a centrally positioned detector and is parallel to the central axis of the array, and the lateral directions are two mutually perpendicular directions that are both perpendicular to the longitudinal direction. If the detector array is curved, the central axis is parallel to the major surfaces of the centrally positioned detector, and the offset direction of each other detector (other than the central detector) is perpendicular to the local front surface of the curved detector array. The detector array may be single-sided or double-sided. If single-sided, the back surfaces of adjacent frontward and rearward detectors may be substantially coplanar or coincident. If double-sided, the back surfaces of adjacent frontward and rearward detectors may be offset from each other in a similar way as the front surfaces.

In some embodiments, the frontward detectors can block particles arriving from various directions, thereby restricting or collimating the angular view of the rearward detectors. Due to the collimation, only one rearward detector generally has an unobstructed view of a source which is in front of the detector array, and all other rearward detectors are at least partially blocked by the adjacent frontward detectors. Consequently, the distribution of detections in the rearward detectors may exhibit a narrow "detection peak" comprising a set of detectors with enhanced detections. The frontward detectors may also detect the particles but without the collimation, and therefore the frontward detectors may have a broader spatial distribution of detections, which is determined by the geometrical area of each frontward detector as viewed by the source. In some embodiments, the processor may be configured to determine the front-versus-back position of the source according to whether the narrower detection peak is in the frontward or rearward detectors. The "narrower detection peak" means whichever of the frontward and rearward detection peaks has the smaller width. The processor may be configured to determine the lateral position of the source according to the lateral position of the narrower detection peak, and/or the distance to the source according to the width of the narrower detection peak, and/or the angle of the source according to the distribution of detections in the frontward or rearward detectors, in various embodiments. The "lateral position" of a source means the two lateral coordinates of the source. The "longitudinal position" of a source is the distance of a source from the detector array.

Examples are presented for detecting gamma rays and neutrons, but the principles disclosed herein are readily applicable to other particle types as well. In applications involving clandestine radioactive threats, the ability to rapidly determine the location of a source is of critical importance.

FIG. 1 is a perspective sketch of an exemplary detector array 100 according to some embodiments, including frontward 101 and rearward 102 prism-shaped detectors configured to detect particles 108 from a source 109, and to responsively produce signals 106 that are received by a processor 105. The detectors 101-102 are shown positioned with their adjacent faces substantially in contact and oriented parallel to the central axis 110. The front surfaces of the frontward detectors 101 are displaced toward the front (to the right in the drawing), and the front surfaces of the rearward detectors 102 are recessed toward the back. The distance between the front surfaces of the frontward and rearward detectors 101-102 is the offset distance 103. Also indicated is the thickness 104 of the detectors 101-102, which are shown square in this case. The overall lateral dimensions of the detector array 100 are indicated as 112 and 111 in the X and Y directions respectively. The offset direction is in the longitudinal direction, which is parallel to the central axis 110, and is indicated as the Z direction in the sketch.

In some embodiments, the frontward and rearward detectors 101-102 may be interleaved, or otherwise placed successively in a two-dimensional pattern, so that each rearward detector 102 is at least partially surrounded by frontward detectors 101. In the depicted embodiment, the pattern is a checkerboard pattern in which each rearward detector 102 has four adjacent frontward detectors 101 (other than the edgemost detectors which are only partially surrounded). Thus, each rearward detector 102 is collimated by the adjacent frontward detectors 101, which protrude frontward by the offset distance 103 and thereby block particles 108 that arrive from various directions.

In some embodiments, such as single-sided embodiments, the rear surfaces of the frontward and rearward detectors 101-102 may be substantially coplanar or coincident, as shown in the figure. "Substantially" coplanar or coincident means that the rear surfaces of adjacent rearward 102 and frontward 101 detectors are at the same longitudinal position to within a small distance such as 0.1 or 0.2 times the thickness 104 of the detectors 101-102. Thus, in the single-sided version, the front surfaces may be staggered or offset according to a two-dimensional pattern, while the rear surfaces may be coplanar, or not offset from each other, as shown in the figure.

In other embodiments, such as double-sided embodiments, the rearward detectors may be offset rearward relative to the frontward detectors in both front and back. The distance between the back surfaces of the frontward and rearward detectors may be equal to the distance between their respective front surfaces, that is, the offset distance is the same front and back. In that case, all of the detectors may have the same longitudinal length, and the rearward detectors are simply displaced rearward relative to the frontward detectors. Thus, the rear surfaces of adjacent frontward and rearward detectors may be offset from each other in the same way that the front surfaces are offset from each other, with the frontward detectors protruding from the front of the detector array and the rearward detectors protruding from the back of the detector array. A source in the back region may then be localized using a narrow detection peak in the same way as a source in the front is localized. In particular, the rearward detectors may serve as collimators for particles arriving from the back, blocking particles at various angles from reaching the frontward detectors, and therefore a narrow detection peak may be observed among the frontward detectors when the source is in the back.

An alternative double-sided detector version (termed the "long-short" version) may include frontward detectors which are substantially longer than the rearward detectors. The short rearward detectors may be centered longitudinally, so that the long frontward detectors protrude outward from both the front and back of the array. Thus, the long frontward detectors may serve as collimators for the rearward detectors as viewed by sources in front of the array, as well as sources behind the array. In that case a narrow detection peak may be formed among the short rearward detectors regardless of whether the source is in front or behind the array.

In some embodiments, the detectors 101-102 may include a material suitable for detecting the particles and/or their charged secondaries. For example, the detectors 101-102 may include scintillators, semiconductors, or gaseous ionization types of detectors. Scintillators may include organic types such as organic crystalline (stilbene or anthracene for example) or polymer (polyvinyltoluene PVT for example) or liquid (based on mineral oil or other organic liquid for example), or inorganic types such as NaI, BGO, LYSO, CsI, $CdWO_4$, and scintillating glass among many other possibilities. For detecting neutrons, the detectors 101-102 may include a transparent matrix such as polycarbonate or polystyrene or acrylic or glass, which may be coated or loaded with a neutron-specific scintillator such as layered ZnS or scintillator microbeads for example. The ZnS or the scintillator microbeads may contain or be proximate to a neutron-capture nuclide such as lithium or boron, and may include lithium glass or borosilicate scintillator. Semiconductor detectors may include n-type or p-type reverse-biased junctions, optionally including a converter layer of hydrogenous material for neutron scattering, or a neutron-capture material such as boron or lithium, or a high-Z material for gamma conversion (Z being the atomic number). Gaseous ionization detectors may include proportional counters, Geiger tubes, or other gas-filled enclosures configured to collect ionization charges generated by the particles and/or their secondaries. The gaseous ionization detectors may include a converter material, such as a layer or coating of a high-Z material for Compton scattering of gamma rays, or a lithium or boron layer (or $BF_3$ or $^3He$ gas fill) for neutron capture reactions, or a hydrogenous layer for scattering of fast neutrons, for example. Responsive to detecting the particles, the detectors 101-102 may emit signals 106 such as electronic pulses which may be conveyed to the processor 105 for analysis. The detectors 101-102 and/or the processor 105 may include optical and/or analog electronics to tailor the signals 106 for analysis, such as light sensors for scintillator detectors, or amplifiers for semiconductor detectors, as well as transducers, filters, amplifiers and the like.

In some embodiments, the detectors 101-102 may be configured to detect one particle type and to not detect another particle type, such as detecting neutrons but not gamma rays, or vice-versa. For example, ZnS scintillator is mainly sensitive to the dense tracks of neutron-capture ions and relatively insensitive to Compton electrons. For gamma detection, many inorganic scintillators such as NaI and BGO are efficient gamma detectors but nearly neutron-blind due to the low neutron-capture rates for the nuclides involved and the lack of recoil protons.

In some embodiments, the detectors 101-102 may be configured to detect two particle types and generate distinct signals upon such respective detections, such as a first signal responsive to detecting a neutron interaction, and a second signal different from the first signal responsive to detecting a gamma ray interaction. The detectors 101-102 may be configured to emit signals indicative of the particle type, such as PSD (pulse-shape discriminating) organic scintillators, or certain inorganic scintillators such as CsI and elpasolites, that emit differently shaped pulses for gamma-generated electrons and neutron-generated ions. Alternatively, the processor 105 may be configured to identify neutron capture events in which two separate pulses occur in succession, corresponding to thermalization of the incident neutron followed microseconds later by emission of neutron-capture ions.

In some embodiments, the processor 105 may be configured to reject events in which a signal 106 corresponds to an energy deposition greater than the maximum energy of the particles being sought. For example, most gamma rays and neutrons from nuclear materials have energies in the range of 1-2 MeV with a few reaching 4-10 MeV. A cosmic ray, on the other hand, traveling at nearly the speed of light, generally deposits energy at a rate of 2 MeV per cm of path in organic scintillators (with density of about 1 $gm/cm^3$). In a plastic scintillator detector with a thickness 104 of 20 cm, cosmic rays generate huge pulses corresponding to at least 40 MeV, which can be eliminated by an energy cutoff at about 5 MeV.

In some embodiments, the thickness 104 of the detectors 101-102 may be related to the average interaction distance of the particles 108 in the detector material. The average interaction distance is the distance that the particle 108 travels, on average, before being scattered or absorbed or otherwise interacting detectably with the material. For gammas, the average interaction distance may be an inverse mass-attenuation factor. For energetic neutrons, the average interaction distance may be an elastic scattering distance. For thermal or epithermal neutrons, the average interaction distance may be a (projected) neutron-capture mean free path. In some embodiments, the detector thickness 104 may be at least equal to the average interaction distance of the particles 108 in the detector material. Alternatively, the detector thickness 104 may be 2 or 3 or more times the average interaction distance or other factor times the average interaction distance. The frontward detectors 101 may thereby provide sufficient collimation to restrict the angular field of view of the rearward detectors 102.

In some embodiments, the offset distance 103 may be related to the detector thickness 104. For example, the offset distance 103 may be at least equal to the detector thickness 104, thereby blocking particles 108 that arrive at certain angles, and thereby providing a sufficiently narrow angular field of view of the rearward detectors 102. In other embodiments, the offset distance 103 may be 2 or 3 times the detector thickness 104 for improved angular resolution, and in some embodiments the offset distance 103 may be 4 or 5 times the detector thickness 104 or more. A higher ratio results in a narrower angular field of view for each rearward detector 102.

In some embodiments, the lateral dimensions 111-112 of the detector array 100 may be 0.2 to 0.5 meter to intercept a sufficient fraction of the emitted particles 108, and more preferably at least 1 meter for a greater solid angle, and may be 2 or 3 or 5 or 10 or 20 meters or more when needed to scan large objects. The number of detectors 101-102 in the detector array 100 may be substantially equal to the product of the lateral sizes 111 and 112 of the array, divided by the detector thickness 104 in the two lateral directions. This assumes each detector 101-102 is a square prism shape and ignores intervening materials such as foil and tape for example. In some embodiments, the number of detectors may total at least 25 to provide a sufficient spatial resolution, and more preferably at least 40 detectors for a larger total field of view, and may be 200 or 500 or 1000 or more detectors in a large inspection installation.

In a first exemplary embodiment, for detection of gamma rays, the detectors 101-102 may include a PVT-based scintillator configured to detect 1-2 MeV gamma rays by Compton scattering. The detector array 100 lateral dimensions 111 and 112 may be 2.4 meters and 15 meters respectively, the detector thickness 104 may be 15 cm, the total number of detectors may be 1600. The offset distance 103 may be 25 cm, thereby providing a detection area of 36 square meters and a weight (not including accessories discussed below) of about 19 tons.

In a second exemplary embodiment, for detection of additional gamma rays, the detectors 101-102 may include BGO scintillator configured to detect 100-500 keV gamma rays. The detector array lateral size 111-112 may be 0.5 meter by 1 meter, the detector thickness 104 may be 2 cm, the total number of detectors may be 1250, and the offset distance 103 may be 2 cm, thereby providing a detection area of 0.5 square meters and a total weight of about 110 kg.

In a third exemplary embodiment, for detection of high-energy neutrons, the detectors 101-102 may include a PMMA matrix loaded with scintillating microbeads containing ZnS or other scintillator, along with lithium or boron neutron-capture targets, and thereby configured to detect slow neutrons as well as fast neutrons by moderation and capture. The detector array lateral size 111-112 may be 4×20 meters, the detector thickness 104 may be 10 cm, the total number of detectors may be 8000, the offset distance 103 may be 20 cm, thereby providing a detection area of 80 square meters and a detector array weight of about 20 tons.

In a fourth exemplary embodiment, for detection of low-energy neutrons, the detectors 101-102 may include gaseous ionization detectors comprising enclosures containing a neutron-capture nuclide, a wire grid at high positive voltage, and a gas that promotes electron drift toward the wire grid when ionized by an energetic particle. For example, the gas may include $^3$He or $BF_3$, thereby comprising the neutron-capture nuclide. Alternatively, the walls of the enclosure may be coated with LiF, $B_4C$, boron metal, or another neutron-capture compound. Other surfaces, such as electrodes comprising aluminum or other conductor, may be coated on one or both sides with neutron-capture compounds. Preferably such layers are thin enough to allow neutron-capture ions, such as tritons and alpha particles, to escape from the layer into the gas, thereby generating an ionization pulse that indicates the detection of a low-energy neutron. The detector array may have a lateral size 111-112 of 3×12 meters and an overall longitudinal dimension of 1 meter, thereby providing a detection surface area of 36 square meters and a weight of about 1 ton, assuming aluminum/plastic construction.

Figure 2:
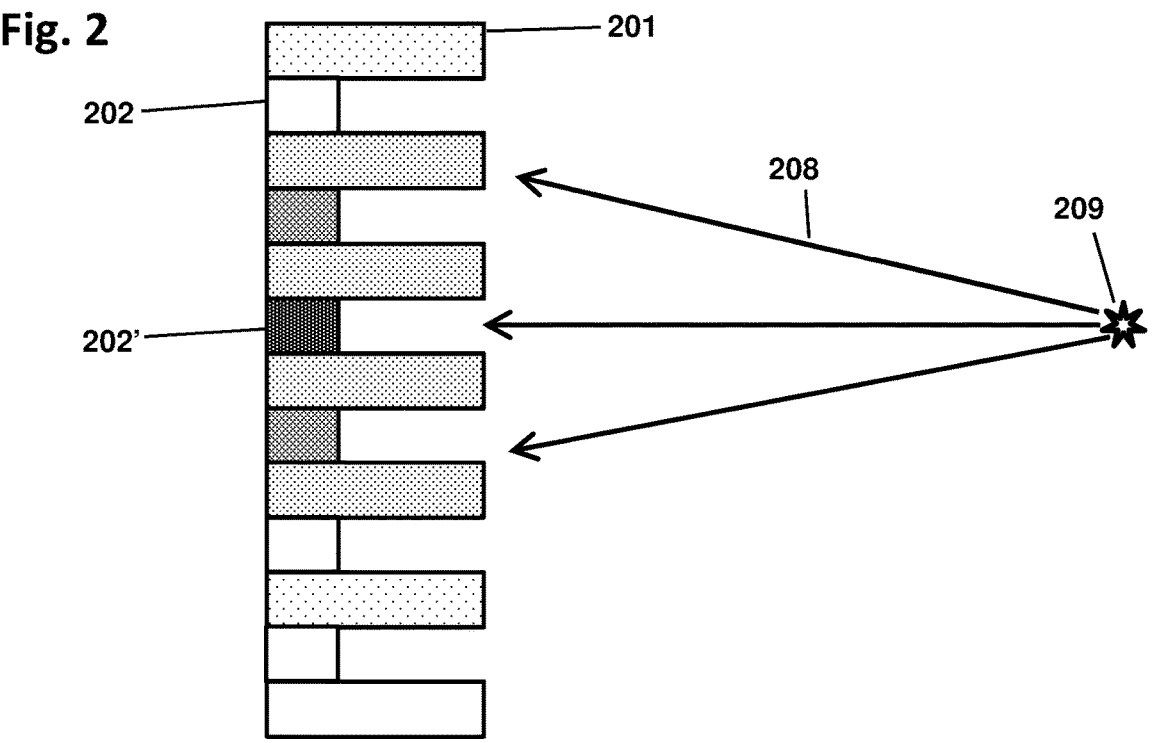
FIG. 2 is a cross-section sketch of an exemplary detector array including frontward and rearward detectors and a radioactive source, according to some embodiments.

FIG. 2 is a cross-section sketch of an exemplary detector array showing frontward detectors 201 alternating with rearward detectors 202 according to some embodiments. A source 209 is shown in front (to the right) and is emitting particles 208. A particular rearward detector 202' is directly aligned at the source 209, and therefore is unobscured by the frontward detectors 201, and therefore has a high detection rate as indicated by the dark stipple fill. The other recessed detectors 202 are either partially or completely obscured, and therefore have lower detection rates, as shown in medium stipple or clear. The distribution of detections in the various recessed detectors 202 thus exhibits a narrow detection peak (see, e.g., the various peaks depicted in FIG. 4, described subsequently), or region of enhanced detection, with a maximum detection rate in the particular recessed detector 202' that is directly aligned with the source 209. The lateral position of the detection peak in the recessed detectors 202 thereby indicates the lateral position of the source 209.

The frontward detectors 201 also detect the particles 208, but unlike the rearward detectors 202, the frontward detectors 201 have a much broader detection distribution since the frontward detectors 201 directly face the source 209 without collimation. In general, each frontward detector 201 has a detection rate proportional to its geometrical area as viewed by the source 209, and consequently the detection distribution of the frontward detectors 201 is much wider than the narrow detection peak of the rearward detectors 202. In some embodiments, the processor may be configured to compare the detection distributions in the various detectors 201-202 and thereby determine whether the rearward detectors 202 have a narrower detection distribution than the frontward detectors 201, and thereby determine whether the source 209 is in front or behind the detector array. More specifically, if the detector array is single-sided, and the source is in back, then the frontward and rearward detectors 201-202 both exhibit a broad distribution of detections rather than a narrow detection peak, due to the lack of collimation when the source is behind the detector array. The processor can therefore determine that the source is in front of the array if a narrow detection peak is observed in the rearward detectors, and that the source is behind the detector array if the frontward and rearward distributions are both similarly broad. Furthermore, when the source is in the back, the observed broad distribution of detections may be sufficient to provide a rough indication of the lateral position of the source, but without the finer precision provided by the collimation effect when the source is in front.

When the source 209 is in the front of the single-sided detector array, the processor may be configured to determine the lateral position of the source 209 according to the lateral position of the detection peak, including both X and Y lateral dimensions. Optionally, the determination may include corrections for edge effects and the like. The source distance may be determined according to the width of the detection peak, which may be measured by a suitable fit or formula such as the FWHM (full width at half-maximum) of the distribution, or a two-dimensional parabolic fit or Gaussian fit or other fitting function, or by other suitable analysis means to estimate the width of the detection peak from the two-dimensional distribution of counting rates among the rearward 202 detectors. In addition, a predetermined peak-width correlation function may be prepared, which relates the width of the detection peak to the source distance. The peak-width correlation function may be prepared experimentally by measuring the width of the detection peak while a test source 209 is placed at various distances from the detector array, or using a simulation program such as MCNP or GEANT. Thus, the processor may be configured to determine the source distance by calculating the width of the detection peak and then providing that value to the predetermined peak-width correlation function, which then provides an estimate of the source distance.

If a source 209 is located outside the direct field of view of the array (that is, the source lateral position is larger than the lateral extent of the array) then a detection peak is generally produced in detectors at an edge of the detector array (that is, "edgemost" detectors). For example, the detectors 201-202 at the edge of the array closest to the source 209 receive most of the particles 208, while the other detectors 201-202 are shielded by that edgemost detector. The resulting distribution of detections can thereby indicate that a source is present and can also indicate the general direction of the source 209.

Figure 3A:
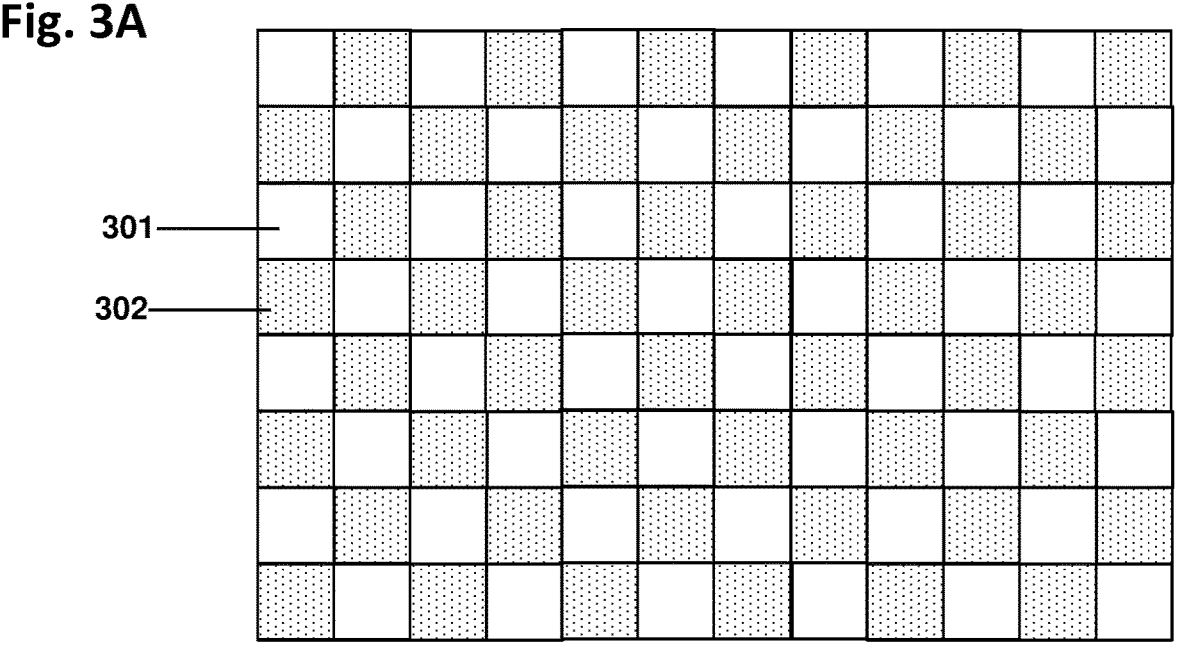
FIG. 3A is a notional front view of an exemplary detector array showing the checkerboard pattern, according to some embodiments.

FIG. 3A is a notional sketch of an exemplary detector array viewed from the front, comprising frontward detectors 301 (shown clear) interleaved two-dimensionally with rearward detectors 302 (light stipple) in a checkerboard pattern. As used herein, a "checkerboard pattern" is a rectangular two-dimensional arrangement of items of a first kind interleaved with items of a second kind, such that each first-kind item has four adjacent neighbors of the second kind, and each second-kind item has four adjacent neighbors of the first kind (other than at the edges of the array, in which one side is open). Thus "first kind" represents the frontward detectors 301 and "second kind" represents the rearward detectors 302.

Figure 3B:
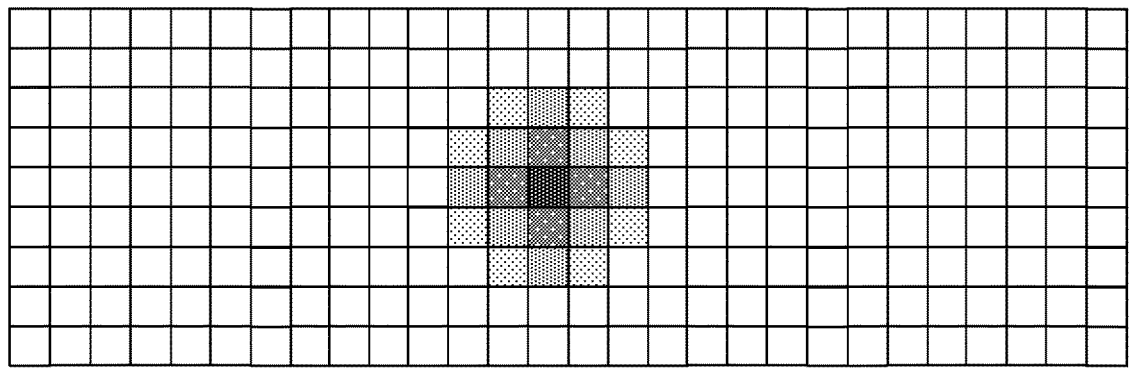
FIG. 3B is a chart showing a detection peak from an MCNP6 simulation of an exemplary detector array with a source distance of 2 meters, according to some embodiments.

FIG. 3B is a chart showing the distribution of detections in the rearward detectors, based on an MCNP6 simulation using a 1 MeV neutron source 2 meters from the detector array. For clarity in the sketch, the checkerboard pattern has been suppressed and only the rearward detection rates are shown. Each simulated detector was a PVT/$^{10}$B scintillator matrix. The detection criterion was alpha production. The stipple density is related to the detection rate. A narrow detection peak is evident, due to the collimation effect of the surrounding detectors.

Figure 3C:
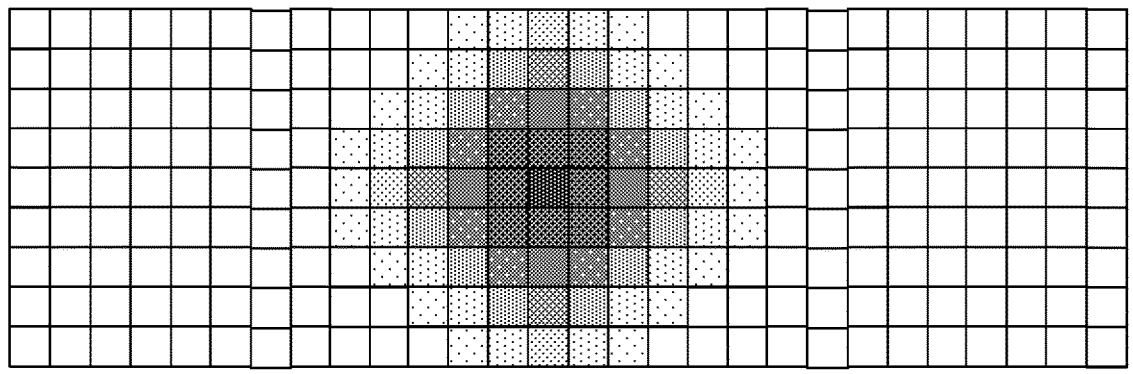
FIG. 3C is a chart showing a detection peak from an MCNP6 simulation of an exemplary detector array with a source distance of 6 meters, according to some embodiments.

FIG. 3C is a similar chart with similar simulated conditions, but now with the source at 6 meters from the array. A much wider detection peak is evident. The increased peak width is due to the larger number of rearward detectors that have a partially unobstructed view of the source, as the source moves farther away. Hence the source distance can be determined from the width of the detection peak.

Figure 4:
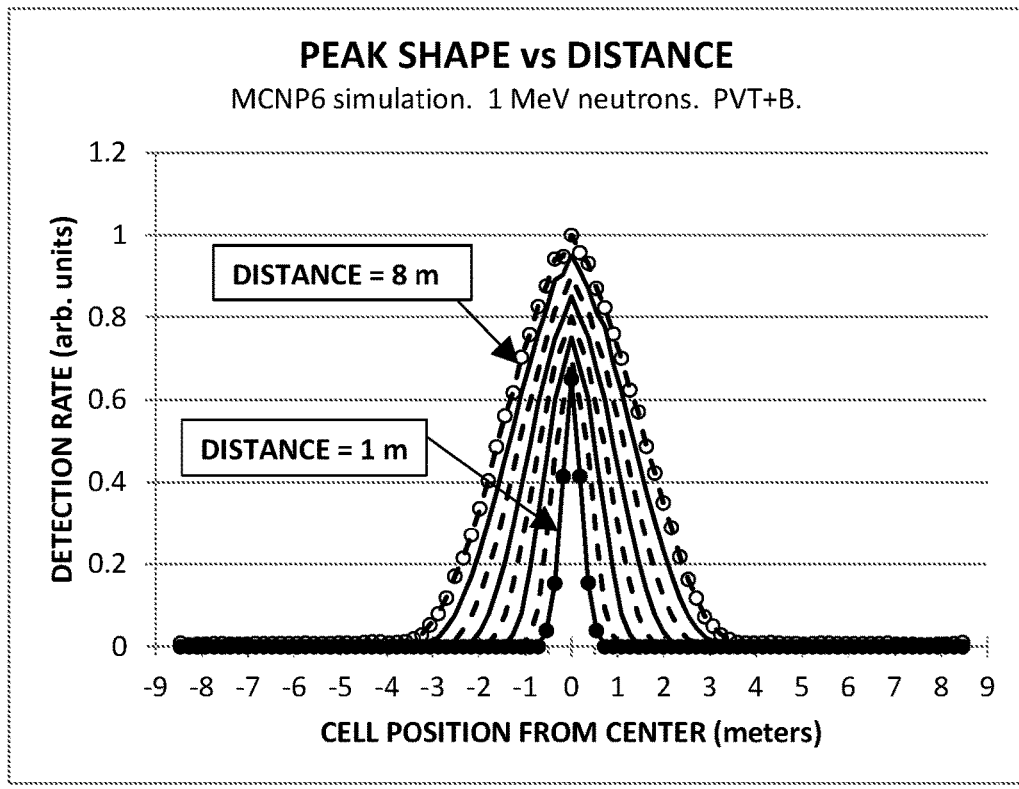
FIG. 4 is a chart showing the shape of a detection peak from an MCNP6 simulation of an exemplary detector array with a source distance of 1 to 8 meters, according to some embodiments.

FIG. 4 is a chart showing the shape of the detection peak for a series of MCNP6 runs using the same parameters as described for FIG. 3B, but with a source distance ranging from 1 to 8 meters. Alternate cases are shown in dash and line. The horizontal axis is the lateral detector position in the array, extending from −8.5 to +8.5 meters. For clarity, the vertical scale of each curve was adjusted so that the curves do not overlap. The results again demonstrate that the source distance is directly related to the peak width, a greater peak width indicating a larger source distance.

Figure 5:
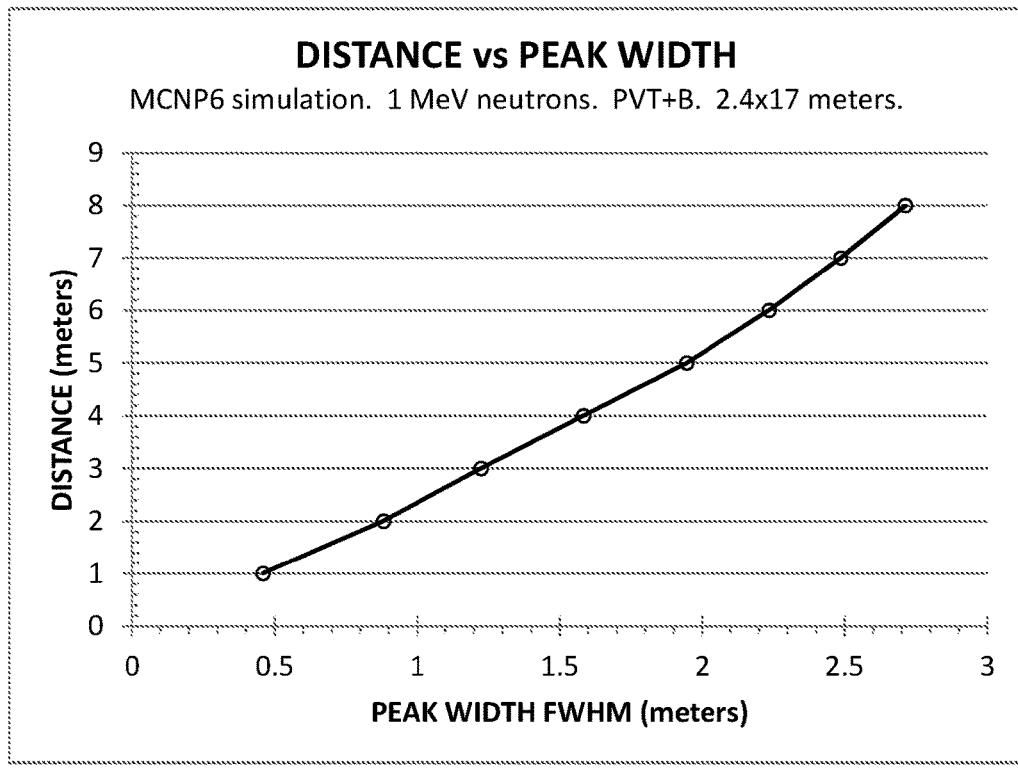
FIG. 5 is a chart showing the results of an MCNP6 simulation of an exemplary detector array that correlates the source distance to the peak width, according to some embodiments.

FIG. 5 is a graph showing peak-width correlation function between the peak width (FWHM) versus the source distance, all in meters, based on an MCNP6 simulation. The correlation function can be used in a real system to determine the source distance from the observed peak width in the rearward detectors, according to some embodiments.

Figure 6:
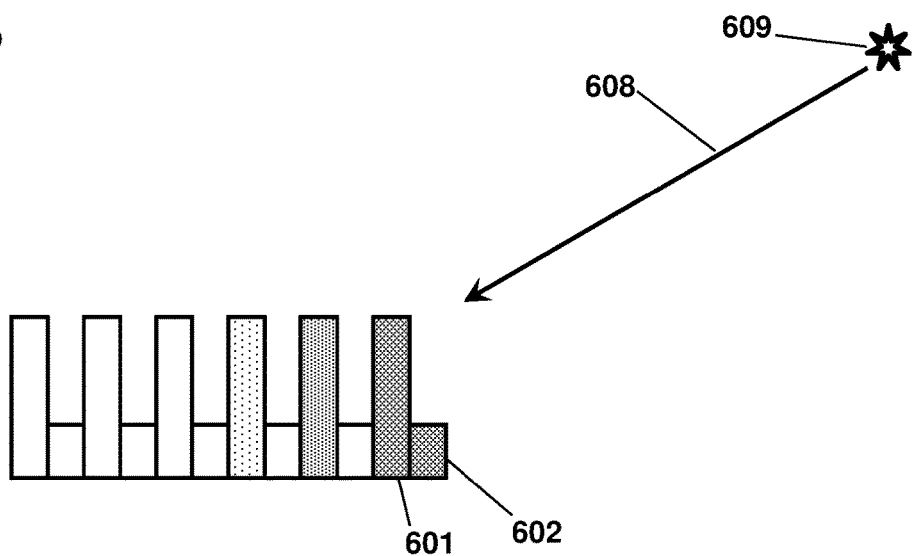
FIG. 6 is a cross-section sketch of an exemplary detector array with a radioactive source outside the direct field of view, according to some embodiments.

FIG. 6 is a cross-section view of a portion of a detector array comprising frontward detectors 601 and rearward detectors 602, with a source 609 placed well outside the direct field of view of the array. Thus, the lateral position of the source 609 is beyond the maximum lateral extent of the array. Particles 608 from the source 609 are detected primarily in the endmost detectors as shown by stipple density, since these are exposed to the source 609. The other detectors are largely shadowed by the endmost detectors. By analyzing the distribution of detection events, the detector array can determine that the source 609 is present, and also the general direction of the source 609 relative to the array, according to some embodiments.

Figure 7:
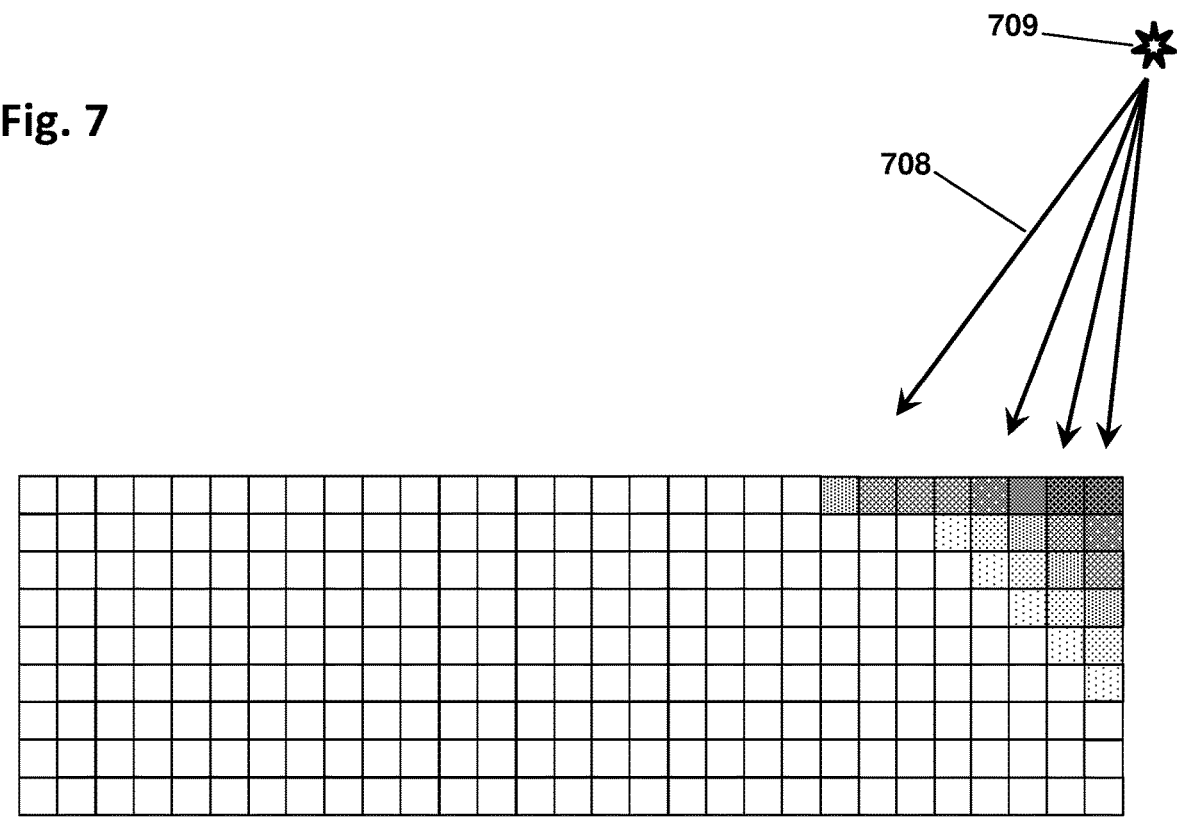
FIG. 7 is a chart showing the detection distribution from an MCNP6 simulation of an exemplary detector array with a source located outside the direct field of view, according to some embodiments.

FIG. 7 is a notional sketch showing a detector array and particles 708 from a source 709 which is beyond the lateral extent of the array. The particles 708 primarily interact with the edgemost detectors that directly face the source 709, leading to the detection distribution shown in stipple density. By analyzing the distribution of detections, the detector array can determine the approximate direction of the source 709, according to some embodiments.

Figure 8:
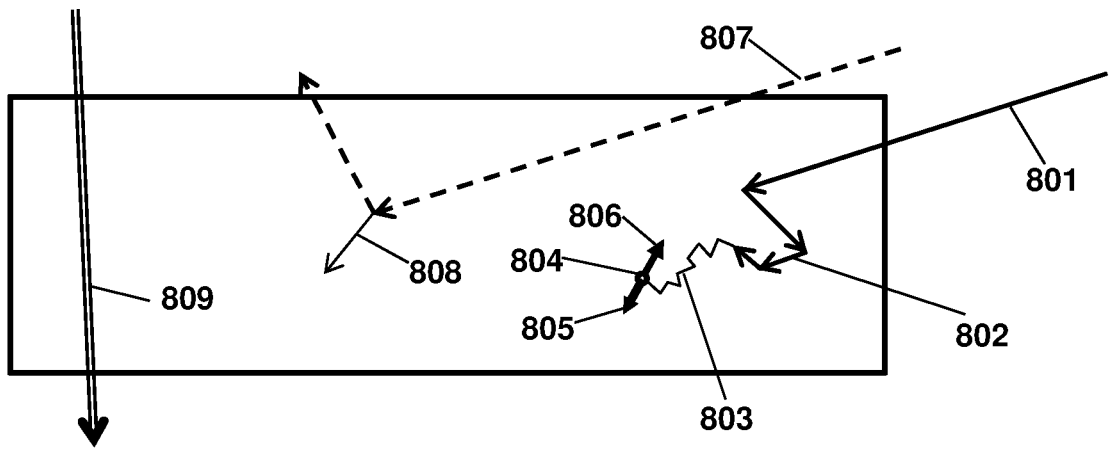
FIG. 8 is a notional illustration of the interaction sequences of a gamma ray, a neutron, and a cosmic ray in an exemplary detector, according to some embodiments.

FIG. 8 is a schematic sketch showing the interactions of various particles in a detector. A high-energy neutron 801 enters from the right, scatters multiple times 802 while losing energy upon each scattering, then diffuses 803 until it is captured by a $^6$Li nucleus 804, which then disintegrates into a triton 805 and an alpha particle 806. A gamma ray 807, shown as a dashed arrow, enters and Compton scatters, producing a scattered electron 808. A cosmic ray muon 809 passes through from a near-vertical direction.

Figure 9:
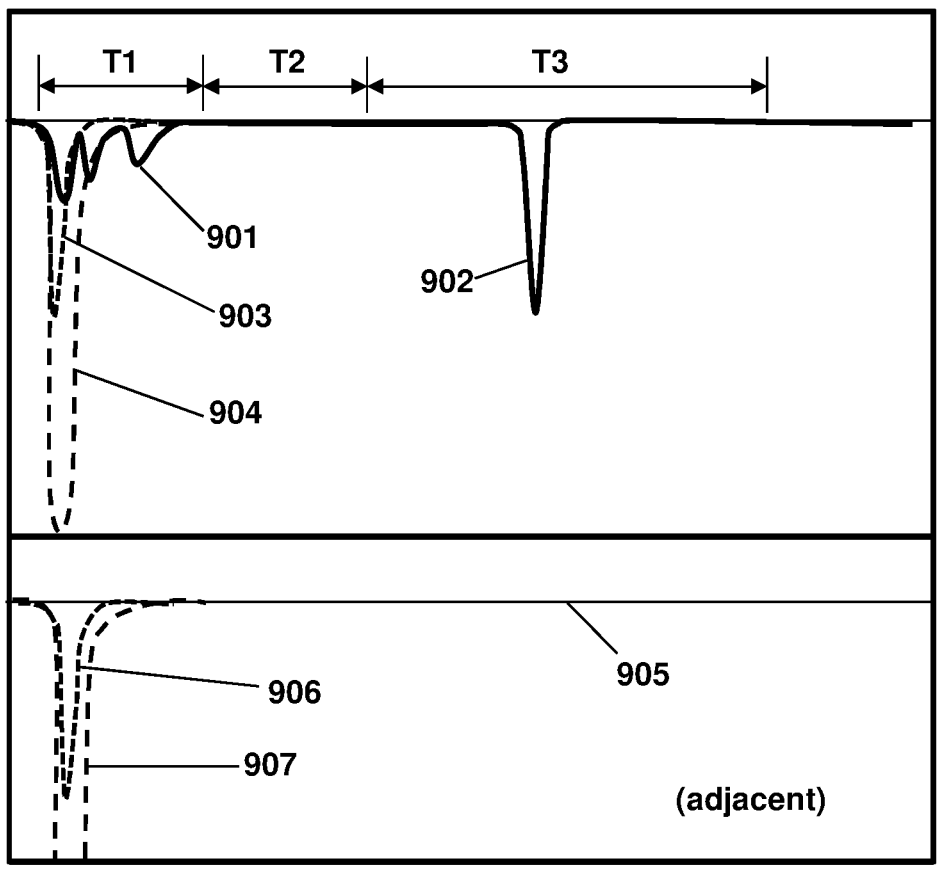
FIG. 9 is a notional illustration of oscilloscope traces showing pulses from various particle interactions in an exemplary detector, according to some embodiments.

FIG. 9 is a schematic sketch showing notional oscilloscope traces of signals corresponding to the events of FIG. 8. The high-energy neutron 801 signal is shown as a solid trace including a series of pulses 901 (which have negative voltage, as is common in many detector signals) during the initial multiple-scattering phase 802 due to recoil protons detected in the detector. The alpha and triton 805-806 are also detected together as a large pulse 902. The initial scattering pulses 901 generally occur within a time interval T1 which is typically less than 1 microsecond. No signal is expected for the diffusion phase 803 which occurs during T2 of a few microseconds typically. Then the neutron capture signal 902 is expected in interval T3 which may range from about 3-10 microseconds up to 20-50 microseconds, depending on the detector material.

Also shown is a typical signal from the Compton scattered electron 808 as a short-dash curve 903. The Compton electron 808 typically stops quickly in most materials, thereby producing the short signal depicted.

Also shown is a large signal 904 from the cosmic ray 809 which typically drops 40 MeV in traversing a 20 cm PVT detector for example. The large cosmic ray signal 904 can be rejected since it is much larger than the other particle signals 901-903. Alternatively, the amplitude and rate of cosmic ray signals may be tallied separately for each detector, thereby providing a convenient continuous monitor of the performance of each detector, enabling corrections for drift or other problems.

Also shown is the signal 905 in a second, adjacent detector. The Compton-scattered gamma ray 807 has entered the adjacent detector and scattered a second time, producing a second Compton electron signal 906. The cosmic ray 809 has penetrated both detectors and generated a second large signal 907 in the adjacent detector. The neutron 801 and its secondaries 805-806 did not reach the second detector, and therefore did not generate a signal in the second detector. Events with signals in more than one detector can be rejected, or can be tallied as special events according to some embodiments.

Figure 10:
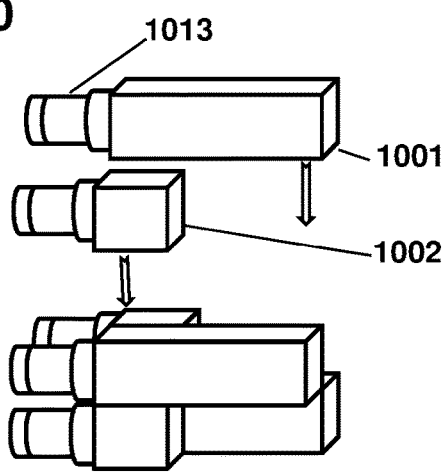
FIG. 10 is a perspective sketch showing how exemplary frontward and rearward detectors can be assembled in the detector array, according to some embodiments.

FIG. 10 is a perspective sketch of exemplary frontward 1001 and rearward 1002 detectors comprising scintillators with photomultiplier tubes 1013 attached to the back surfaces. Arrows indicate how the detectors 1001-1002 can be assembled into a portion of the detector array.

Figure 11:
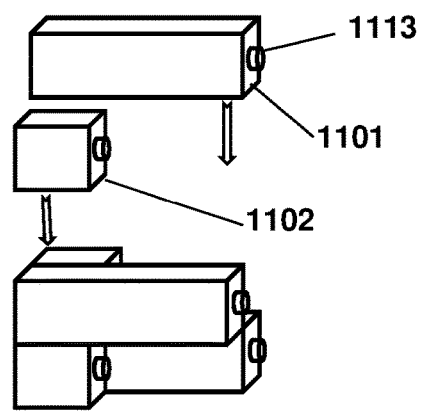
FIG. 11 is another perspective sketch showing how exemplary frontward and rearward detectors can be assembled in the detector array, according to some embodiments.

FIG. 11 is a perspective sketch of exemplary frontward 1101 and rearward 1102 detectors comprising scintillators with semiconductor light sensors 1113 attached to the front surfaces. Semiconductor light sensors 1113 such as avalanche photodiodes and the like, can be made small enough to block only a negligible fraction of incoming neutrons or gamma rays. Arrows indicate how the detectors 1101-1102 can be assembled into a portion of the detector array.

Figure 12A:
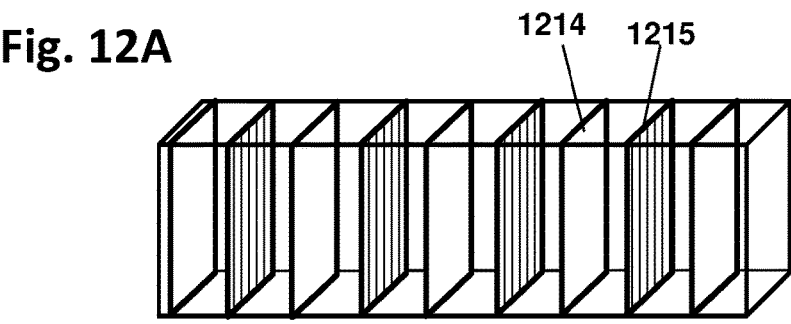
FIG. 12A is a perspective sketch showing how an exemplary gaseous ionization detector can be assembled, according to some embodiments.
Figure 12B:
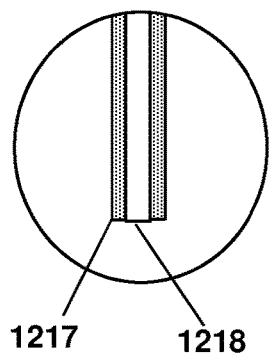
FIG. 12B is a magnified cross-sectional view of an exemplary electrode according to some embodiments.

FIG. 12A is a perspective sketch of an exemplary detector of the gaseous ionization type, such as a proportional chamber configured to detect neutrons, including an enclosure 1227, one or more wire grids 1215, and one or more planar electrodes 1214 mounted parallel to and alternating with the wire grids 1215. The wire grids 1215 may be held at a high positive voltage relative to the planar electrodes 1214. The detector may be filled with a gas that promotes electron transport and avalanche formation at the wire grids 1215, such as P-10 for example, thereby generating detection signals. The gas may also include a neutron-capture nuclide such as $^3$He and/or $^{10}BF_3$ and/or the electrodes 1214 may include lithium or boron or other neutron-capture nuclides FIG. 12B is a magnified view showing an exemplary electrode including a conducting plate or foil 1218 such as aluminum foil, coated on one or both sides with a thin layer 1217 of a neutron-capture material such as $^6$LiF or $^{10}B_4C$ or boron metal, or other compound that includes a neutron-capture nuclide, with or without isotopic enrichment. Such layers 1217 may be configured to allow the energetic neutron-capture ions to escape from the layer 1217 and pass into the gas, causing ionization which can then be detected as a discharge at the wire grids 1215. The thickness of the layer 1217 may be selected to optimize the detection efficiency. The detection efficiency is generally equal to the product of the neutron capture probability times the ion escape probability. A thicker layer 1217 increases the reaction rate but decreases the escape probability. Simulations indicate that, for thermal neutrons at normal incidence, detection efficiencies of 20-30% can be obtained with 12 planar electrodes 1214 coated on both sides with 1-2 microns of enriched boron or boron carbide, or with 5-20 microns of enriched LiF.

Figure 12C:
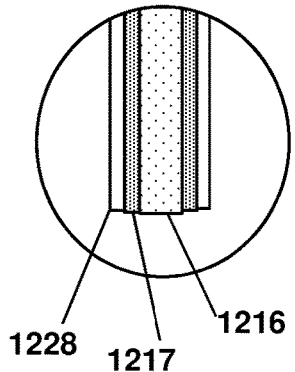
FIG. 12C is a magnified cross-sectional view of another exemplary electrode according to some embodiments.

FIG. 12C is a magnified view showing an alternative exemplary planar electrode including a hydrogenous central moderator sheet 1216 such as a polymer that provides both support and neutron moderation, coated with a thin layer 1217 of neutron-capture material overcoated by a very thin layer 1228 (0.1-0.2 microns) of a conductor such aluminum. The conductor layer 1228 may be thin enough to allow most of the reaction ions to pass through, but thick enough to conduct electricity and maintain a uniform voltage across the conductor layer 1228.

Figure 12D:
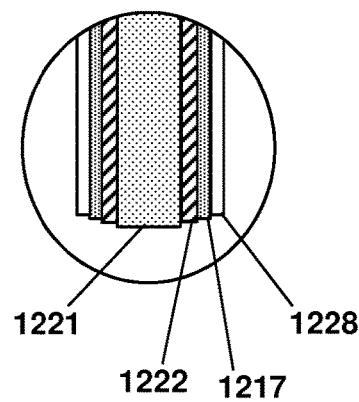
FIG. 12D is a magnified cross-sectional view of yet another exemplary electrode according to some embodiments.

FIG. 12D is a magnified view showing another exemplary planar electrode including a central light guide 1221 such as PMMA, overlain by a thin scintillator layer 1222 (diagonal hatch), overlain by a thin neutron-capture layer 1217, overlain by a very thin conducting layer 1228. For example, the thin neutron-capture layer 1217 may include $^6$Li which emits a triton and an alpha particle back-to-back. The thin scintillator layer 1222 may detect one of the ions while the other ion may pass through the conducting layer 1228 and may be detected by the wire grids 1215. The scintillation light may be conducted in the light guide 1221 to a light sensor such as a photomultiplier tube or photodiode. A valid event may then include a light pulse in one of the planar electrode light guides 1221, due to one of the ions penetrating the scintillator 1222, followed after a short time (0.5-2 microseconds depending on geometry and voltages) by a voltage pulse in one of the adjacent wire grids 1215 due to the other ion penetrating the fill gas.

Figure 13:
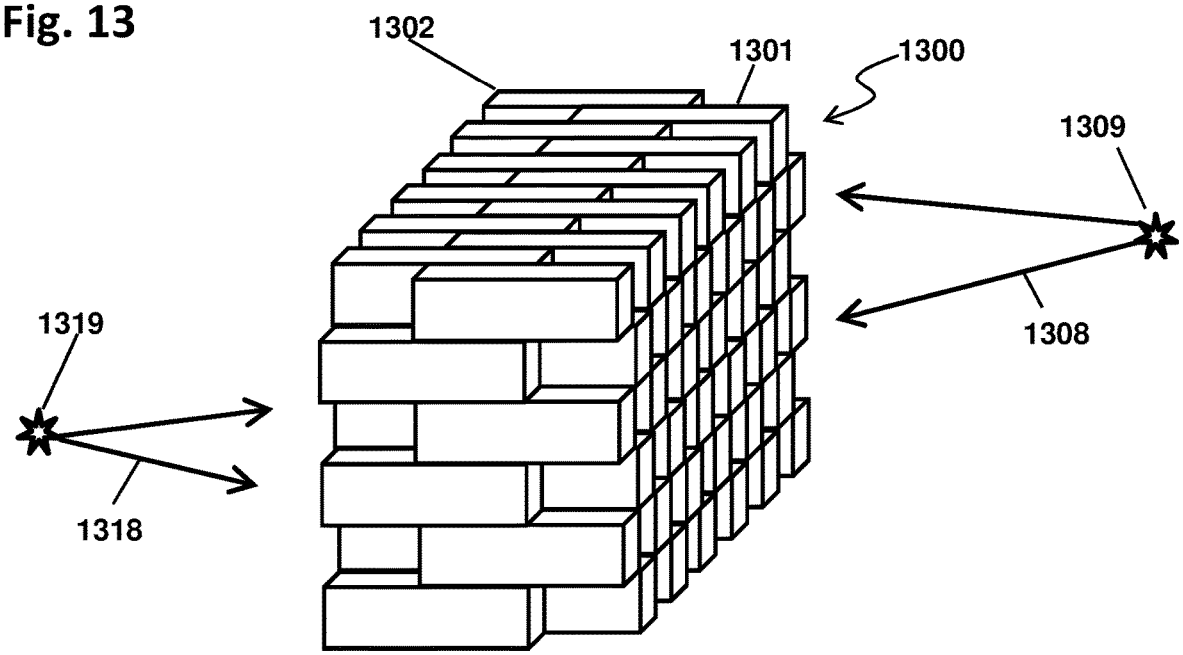
FIG. 13 is a perspective sketch of an exemplary double-sided detector array, according to some embodiments.

FIG. 13 is a perspective sketch of an exemplary double-sided detector array 1300. In some embodiments, the double-sided detector array 1300 can determine the location of a source both in front and behind the array 1300. The depicted double-sided detector array 1300 may include frontward detectors 1301 interleaved with rearward detectors 1302, wherein the frontward detectors 1301 may protrude frontward toward a first source 1309 which is in front of the detector array 1300, while the rearward detectors 1302 may be recessed from the first source 1309. Likewise, the rearward detectors 1302 may be protruding toward a second source 1319 located in back of the array 1300, while the frontward detectors 1301 may be recessed from the second source 1319.

In some embodiments, the double-sided detector array 1300 may determine whether a particular source 1309 or 1319 is in front or behind the array 1300 by measuring detection peaks from particles 1308-1318 observed by the frontward and rearward detectors 1301-1302. If the detection peak in the rearward detectors 1302 is narrower than that of the frontward detectors 1301, then the source is in front. If the frontward detectors 1301 have the narrower peak, then the source is in back. In either case, the lateral position of the source 1309-1319 may be indicated by the lateral position of the narrower detection peak. If the source 1309-1319 is located laterally beyond the edge of the detector array 1300, the source is outside the direct field of view of the detector array 1300. In that case, the edgemost detectors that are directly exposed to the source have the highest detection rates. The processor in some embodiments can then determine, from the distribution of detections in the edgemost detectors, that a source is present and is outside the direct field of view. In addition, the processor in some embodiments can determine the general direction of the source according to the positions of the high-counting edgemost detectors.

Figure 14:
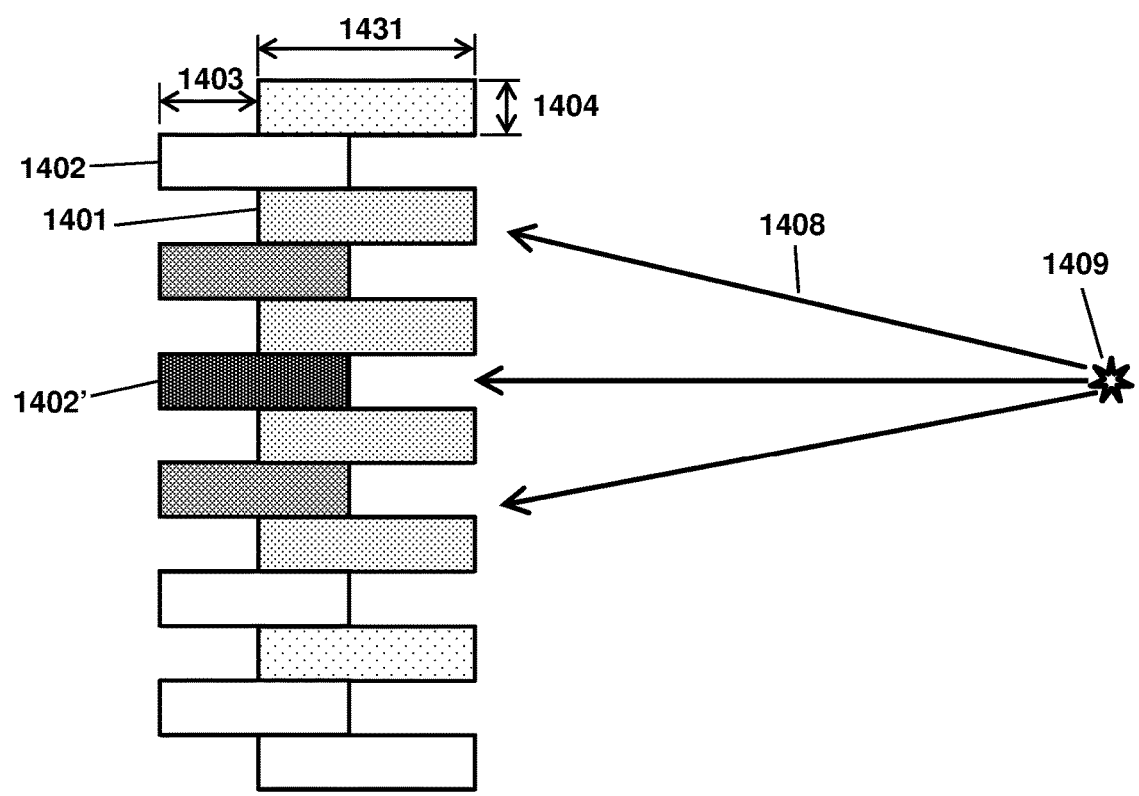
FIG. 14 is a cross-section sketch of an exemplary double-sided detector array, according to some embodiments.

FIG. 14 is a cross-section sketch of an exemplary double-sided detector array comprising frontward detectors 1401 that protrude frontward, alternating with rearward detectors 1402 that protrude rearward. The frontward and rearward detectors 1401-1402 have the same length 1431 and thickness 1404 and offset distance 1403. Particles 1408 streaming from a source 1409 in the front half-space are detected in the detectors 1401-1402. Due to the collimating effect of the frontward detectors 1401, a narrow detection peak is evident in the rearward detectors 1402 as indicated by stipple density, centered on the particular rearward detector 1402' that is directly aligned with the source 1409. Therefore, the lateral position of the highest-counting rearward detector 1402' indicates the lateral position of the source 1409. Likewise, the width of the detection peak in the rearward detectors 1402 indicates the distance of the source 1409. In this way, the double-sided detector array can determine the three-dimensional location of a source 1409 in front and behind the array, depending on which detectors have the narrower detection peak, according to some embodiments.

Figure 15:
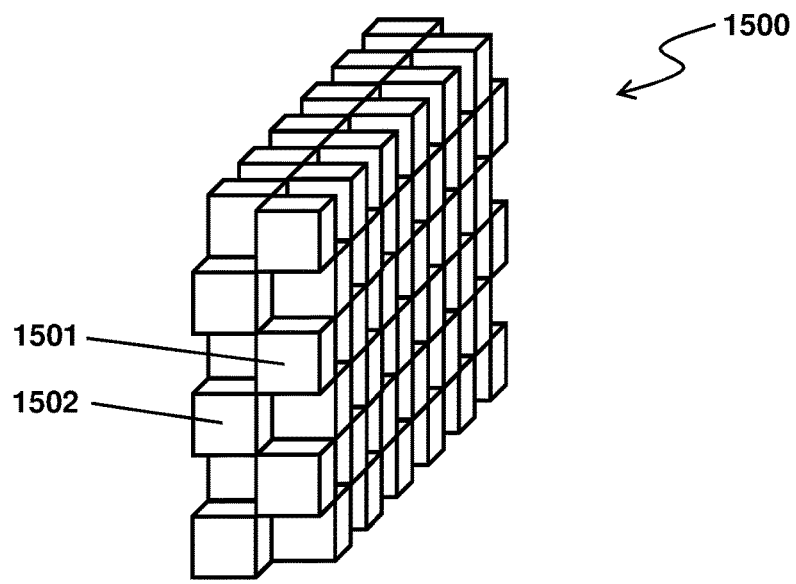
FIG. 15 is a perspective sketch of an exemplary double-sided detector array with no overlap, according to some embodiments.

FIG. 15 is a perspective sketch of an exemplary double-sided detector array 1500 wherein the offset distance is equal to the detector length, so that there is no overlap between the frontward detectors 1501 and the rearward detectors 1502. Such an array may be more compact and lower in weight and cost than an array such as that of FIG. 13 in which the frontward and rearward detectors 1301-1302 partially overlap.

Figure 16:
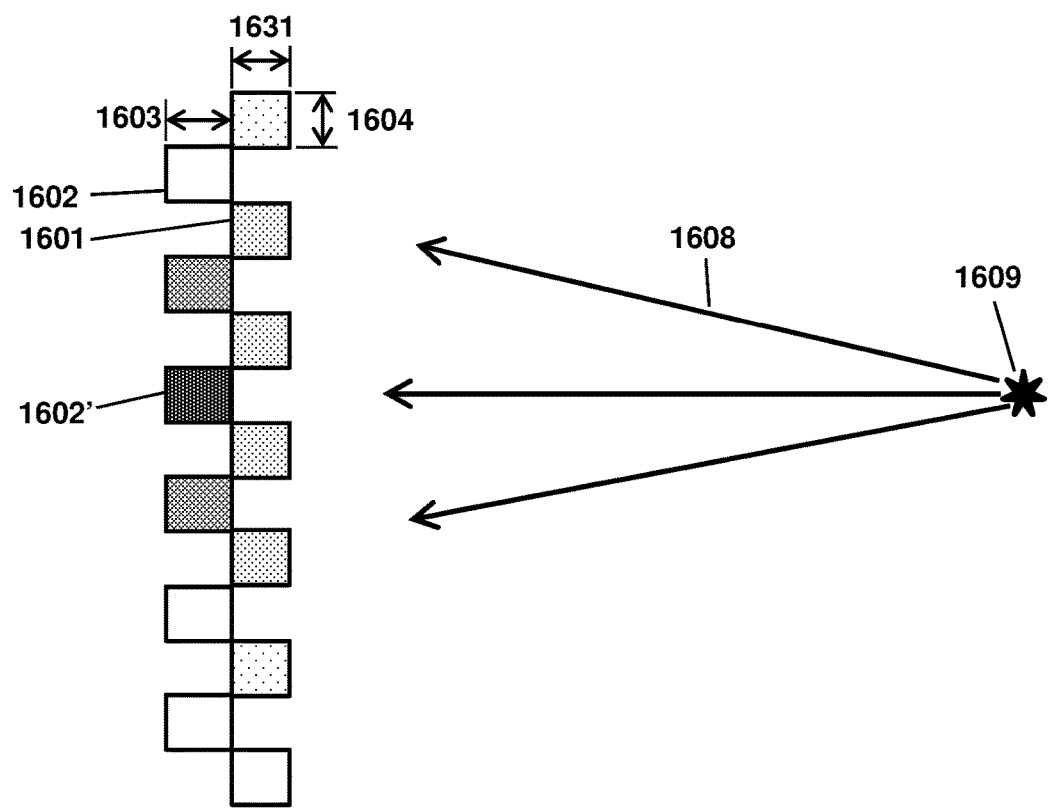
FIG. 16 is a cross-section sketch of an exemplary double-sided detector array with no overlap, according to some embodiments.

FIG. 16 is a cross-section sketch of the double-sided detector array of FIG. 15, comprising frontward detectors 1601 alternating with rearward detectors 1602, and wherein the detector length 1631 is equal to the offset distance 1603, thereby eliminating an overlap between the frontward and rearward detectors 1601-1602. The detector thickness 1604 is also shown. Particles 1608 from a source 1609 in front produce a narrow detection peak in the rearward detectors 1602.

Figure 17:
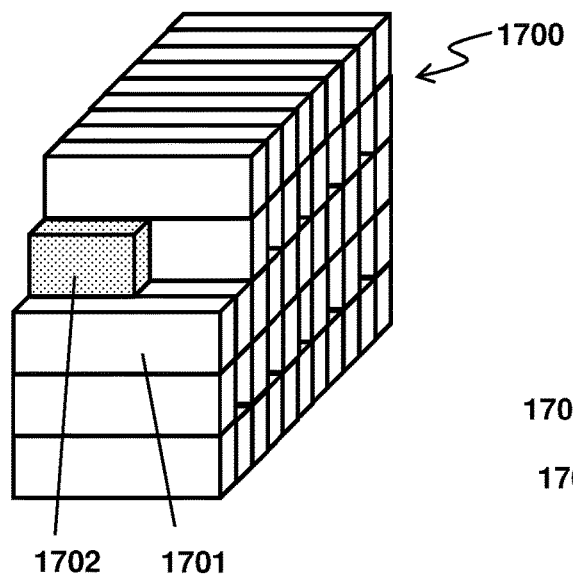
FIG. 17 is a perspective sketch of an exemplary single-sided detector array with enhanced collimation, according to some embodiments.

FIG. 17 is a perspective sketch of an exemplary single-sided detector array 1700 comprising frontward detectors 1701 and rearward detectors 1702 in a repeating two-dimensional symmetrical arrangement that may be termed "centered" as opposed to the "checkerboard" pattern discussed above. In the centered pattern, each rearward detector 1702 is surrounded by eight frontward detectors 1701, instead of four. The centered pattern thereby provides additional collimation for each of the rearward detectors 1702. In the depicted embodiment, the rearward detectors 1702 (only one visible, shown in stipple) are recessed from the front. At the back surface, the frontward and rearward detectors 1701-1702 are flush or coplanar. Therefore, the centered version can determine the lateral position of a source in front according to the lateral position of a detection peak which is observed among the rearward detectors 1702. If a source is behind the single-sided detector array 1700, both the frontward and rearward detectors 1701-1702 have similar detection distributions due to the lack of collimation, thereby indicating that the source is in back. Such broad detection distributions may enable a rough determination of the lateral position of the source in back, but generally not as precise as the localization obtained for sources in the front.

Figure 18:
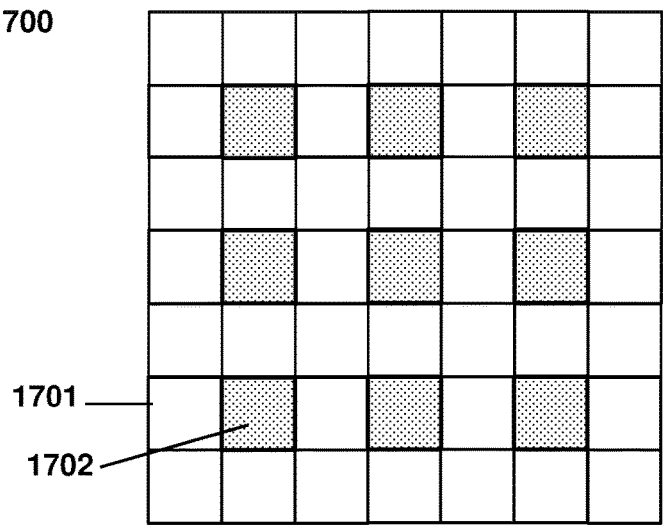
FIG. 18 is a notional front-view sketch of the exemplary detector array of FIG. 17, according to some embodiments.

FIG. 18 is a notional front view of a single-sided detector such as that of FIG. 17, with the centered-type pattern. Using the same label numbers, the frontward detectors 1701 are shown clear, while the rearward detectors 1702 are shown in stipple. As mentioned, each rearward detector 1702 is surrounded by eight of the frontward detectors 1701, thereby providing improved collimation and potentially improving the source location determination for sources in front of the detector array.

Figure 19:
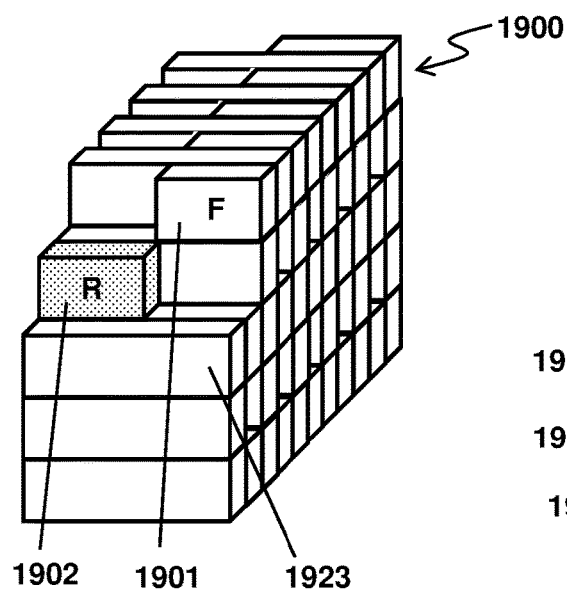
FIG. 19 is a perspective sketch of an exemplary double-sided detector array with enhanced collimation, according to some embodiments.

FIG. 19 is a perspective sketch of an exemplary double-sided detector array 1900 that has a centered-type pattern. The embodiment shown includes recessed detectors surrounded by protruding detectors in both back and front. To do so, three types of detectors are provided, including frontward detectors 1901 (marked "F"), rearward detectors 1902 (stipple, "R"), and "spanning" detectors 1923 that extend from the back to the front of the detector array (shown clear and unmarked). The frontward detectors 1901 are displaced frontward and are flush with the front surfaces of the spanning detectors 1923. The rearward detectors 1902 are displaced rearward and are flush with the back surfaces of the spanning detectors 1923. The detectors 1901, 1902, 1923 are arranged in a repeating two-dimensional pattern that provides a collimated view toward the front for the rearward detectors 1902, and also provides a collimated view toward the back for the frontward detectors 1901. Further illustration of the arrangement is provided in FIG. 20.

Figure 20:
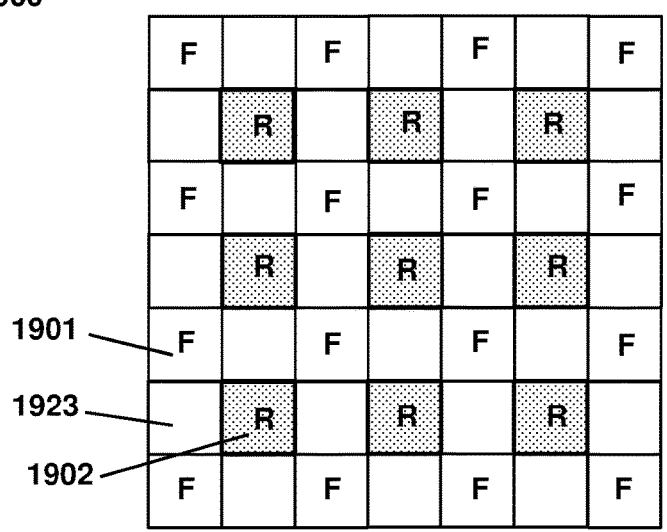
FIG. 20 is a notional front-view sketch of the exemplary detector array of FIG. 19, according to some embodiments.

FIG. 20 is a notional front-view sketch of the double-sided, centered-pattern detector array of FIG. 19. Frontward detectors 1901 are intermingled with rearward detectors 1902 and spanning detectors 1923. Again, the frontward detectors 1901 are labeled "F", the rearward detectors 1902 are stippled and labeled "R", and the spanning detectors 1923 are unadorned. Each rearward detector 1902 (other than edgemost detectors) is surrounded by four adjacent spanning detectors 1923 and four diagonally contacting frontward detectors 1901, thereby providing enhanced collimation for particles from the front. Likewise, each frontward detector 1901 (other than edgemost detectors) is surrounded by four adjacent spanning detectors 1923 and four diagonally contacting rearward detectors 1902, thereby providing enhanced collimation for particles from the back. By assembling the three detector types 1901-1902-1923 in the centered pattern as shown, the detector array can localize sources in front and behind the array in three dimensions, according to some embodiments.

Figure 21A:
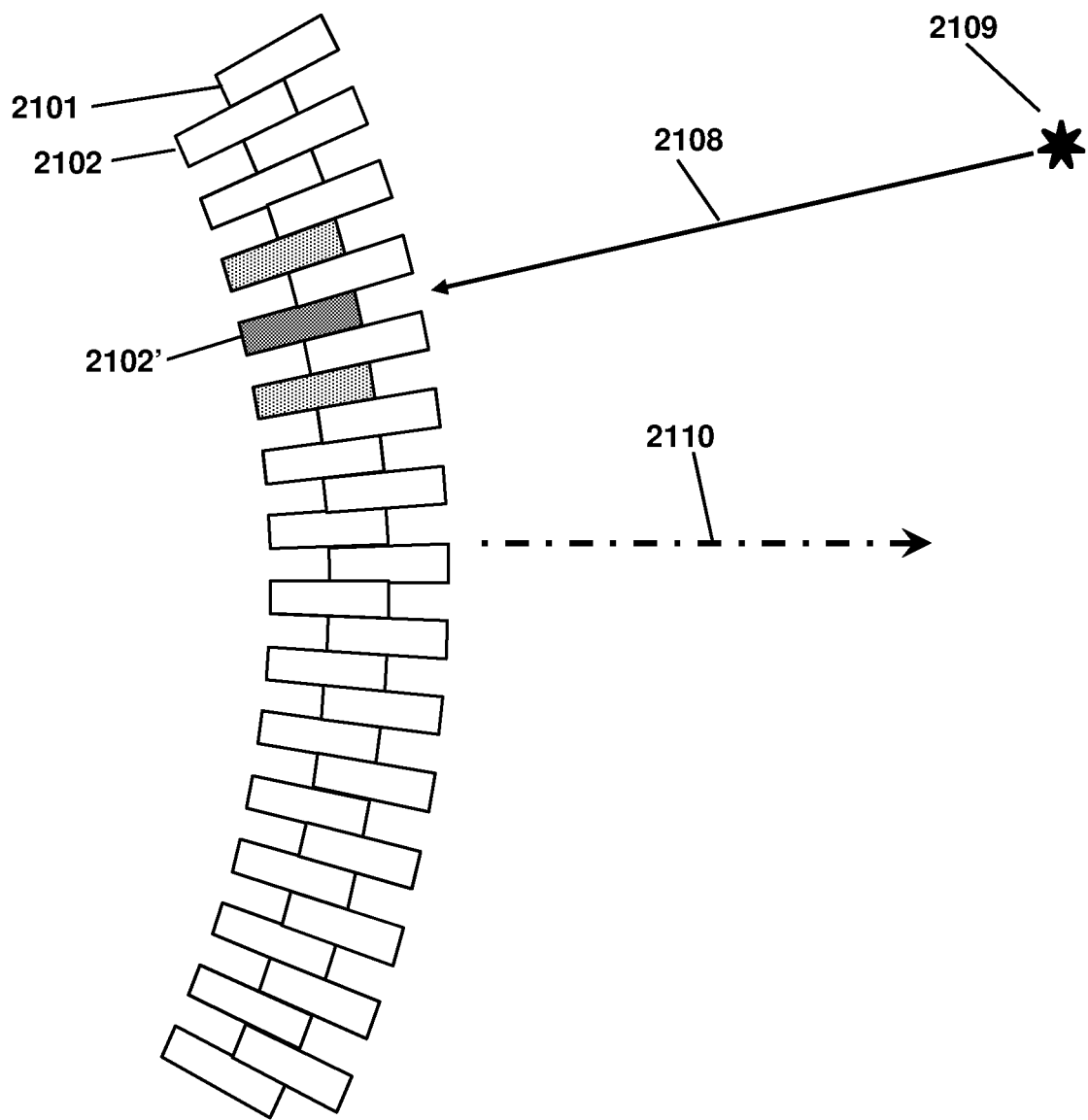
FIG. 21A is a top-view sketch of an exemplary detector array with an arc shape, according to some embodiments.

FIG. 21A is a top-view cross-section sketch of an exemplary arc-shaped detector array including frontward detectors 2101 and rearward detectors 2102 arranged in a cylindrical arc-shaped assembly, with the frontward detectors 2101 being offset radially outward and the rearward detectors 2102 being offset radially inward in a two-dimensional pattern such as a checkerboard pattern. The central axis 2110 is indicated as a vector running centrally from the back to the front of the detector array. A source 2109 in the front (to the right) emits particles 2108 which are detected in the detectors 2101-2102, producing a detection peak in the rearward detectors 2102 centered at a particular rearward detector 2102' that is aligned with the source 2109. The cylindrical arc shape, shown here in cross-section, provides a wider field of view horizontally (in the plane of the sketch) than the flat arrays described above, since the offset directions vary according to position along the arc. The arc-shaped detector array can determine the vertical location of the source, and the azimuthal angle of the source, and the distance of the source, according to the position and shape of the detection peak, thereby determining the source location in three dimensions. As viewed from the top, as depicted, the width of the detection peak in the section shown is not a measure of the source distance since it is primarily determined by the arc radius. Instead, the position of the detection peak, in this view, determines the angle of the source relative to the central axis 2110.

The distance to the source may be determined by the width of the detection peak as measured in the other direction, that is, into the page. The width of the detection peak as measured vertically is related to the source distance in the same way as for a flat array, a larger source distance produces a wider detection peak in the vertical direction. Thus, the cylindrical arc-shaped detector array provides several advantages: the system can localize sources across a wider horizontal field of view than the flat arrays, and the position of the detection peak measured horizontally (or around the arc circumference) indicates the source angle, while the width of the detection peak measured in the direction parallel to the arc axis (that is, out of the page in this sketch) can determine the distance of the source, according to some embodiments.

In the cross-section view depicted, a set of detectors 2101-2102 in a horizontal cross-section plane can determine a source angle according to the position of the detection peak, and can do so across a wide range of angles such as the full angular range of the arc. Viewed in the other direction (vertically or out of the page), the detection peak has a width that is related to the radial distance of the source 2109. Thus, the arc-shaped detector array can localize source positions in three dimensions across a wide field of view, generally across a wider range of angles than the flat arrays discussed above. Also, by applying the same analysis to sources located behind (to the left in this view) the detector array, those sources can be localized as well, with nearly the same wide field of view as for sources in front.

In some applications, the source is expected to be in the front region only, but across a wide field of view. In that case, a single-sided arc-shaped detector array may be sufficient. The depicted double-sided array may be converted into a single-sided array by shortening the rearward detectors 2102 until they are flush with the back surfaces of the adjacent frontward detectors 2101. The reduced detector volume may thereby save weight and costs without affecting the ability to localize sources in front.

Figure 21B:
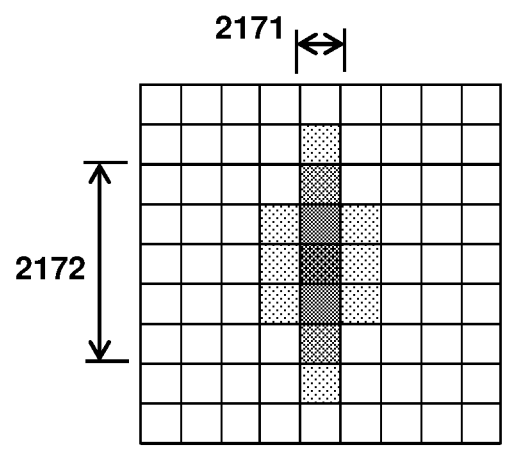
FIG. 21B is a notional front-view sketch of the exemplary detector of FIG. 21A showing an asymmetric detection peak.

FIG. 21B is a notional front-view sketch of the detection peak and surrounding rearward detectors 2102 of the arc-shaped detector array of FIG. 21A. The detection peak, indicated in stipple density, is asymmetric in that the horizontal peak width 2171 is different from the vertical peak width 2172. In this case, "horizontal" means measured circumferentially around the arc and "vertical" means measured perpendicular to the arc (that is, parallel to the arc axis). The horizontal width 2171 is determined primarily by the arc radius, whereas the vertical width 2172 is determined by the radial source distance. This difference is due to the curvature being in the horizontal direction only, for a cylindrical array. In addition, the vertical position of the detection peak is determined by the vertical location of the source 2109, and the angular position of the detection peak is determined by the source angle. Thus, by determining the horizontal position, vertical position, and vertical width of the detection peak, the processor can determine the source angle, the source vertical position, and the source distance, thereby localizing the source in three dimensions, according to some embodiments.

Figure 22:
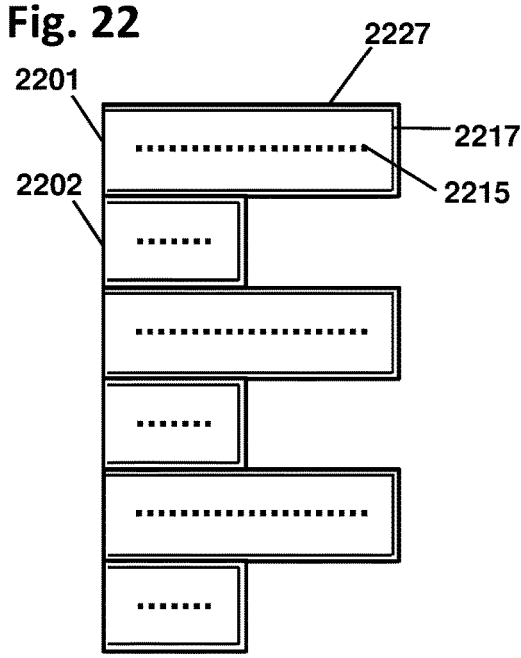
FIG. 22 is a cross-section sketch of an exemplary module of a detector array for detecting low-energy neutrons, according to some embodiments.

FIG. 22 is a cross-section sketch of a portion of an exemplary single-sided detector array configured for low-energy neutron detection. Depicted are frontward detectors 2201 and rearward detectors 2202 which are gaseous ionization type chambers. Each detector 2201-2202 includes an enclosure 2227 lined on the inside surfaces with a thin layer 2217 of a neutron-capture material such as boron or LiF, and a wire grid 2215, and is filled with a gas that promotes electron transport toward the wire grid 2215 and avalanche formation. As mentioned, the neutron-capture layer 2217 may be thick enough to interact efficiently with low-energy neutrons, yet thin enough to allow some or most of the emitted ions to escape into the gas region. The frontward detectors 2201 protrude frontward (to the right) beyond the rearward detectors 2202 and, due to the neutron-capture layers 2217, can prevent low-energy neutrons at various angles from reaching the rearward detectors 2202. A processor can thereby determine the location of a source, or at least the arrival directions of the low-energy neutrons, according to a detection peak in the rearward detectors 2202.

Figure 23:
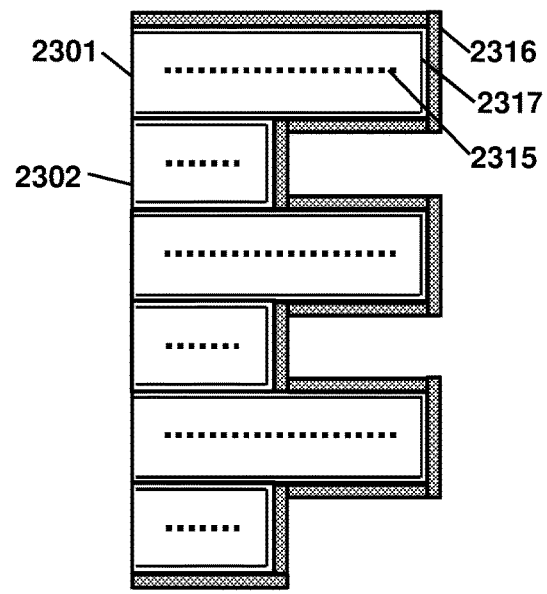
FIG. 23 is a cross-section sketch of an exemplary module of a detector array for detecting broad-spectrum neutrons, according to some embodiments.

FIG. 23 is a cross-section sketch of a portion of an exemplary detector array for detecting neutrons across a wide range of energies, including frontward and rearward detectors 2301-2302. Each detector 2301-2302 may be a gaseous ionization detector including a thin layer 2317 of neutron-capture material and a wire grid 2315 for detection of the neutron-capture ions. In addition, a layer of hydrogenous moderator 2316, such as a polymer, may be applied to the interior and/or exterior of each detector 2301-2302 to moderate high-energy neutrons, while low-energy neutrons pass through by diffusion. Since the moderator 2316, cooperating with the neutron-capture layer 2317, blocks neutrons from various angles, a detection peak in the rearward detectors 2302 indicates the location of the neutron source.

Figure 24:
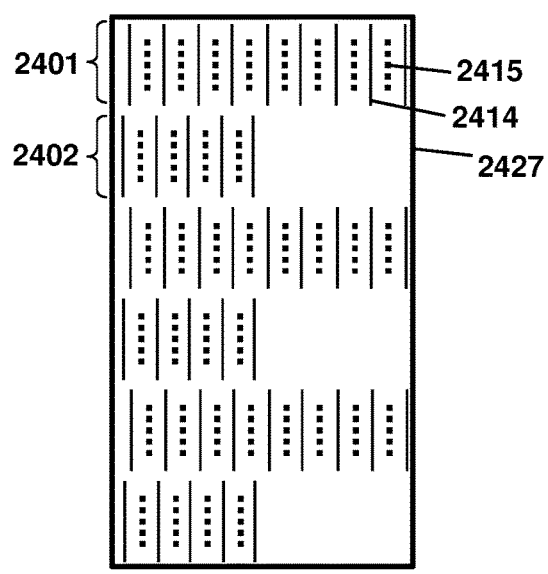
FIG. 24 is a cross-section sketch of an exemplary module of a detector array for detecting low-energy neutrons with increased efficiency, according to some embodiments.

FIG. 24 is a cross-section sketch of a portion of an exemplary single-sided detector array for low-energy neutron detection, including several frontward and rearward detectors 2401-2402 within an enclosure 2427 filled with a gas that promotes electron drift and avalanche. Each detector 2401-2402 may be formed by a series of alternating wire grids 2415 and planar electrodes 2414 oriented perpendicular to the longitudinal direction. Neutron-capture material may be coated onto the inside surface of the enclosure 2427 and/or the surfaces of the planar electrodes 2414. The gas filling the enclosure 2427 may include neutron-capture nuclides. The planar electrodes 2414 and wire grids 2415 may be arranged in alternating stacks as shown, with short stacks thereby forming the rearward detectors 2402 and long stacks forming the frontward detectors 2401.

The depicted embodiment may provide high detection efficiency for neutrons incident from the front, by providing a plurality of successive planar electrodes 2414 comprising neutron-capture material, thereby providing a large surface area of neutron-capture material which gives neutrons many opportunities to interact and be detected. In passing through multiple such electrodes 2414, the neutron is increasingly likely to be captured. The depicted embodiment may be economical and light-weight since a single gas enclosure 2427 may provide space for multiple detectors 2401-2402 using a single gas supply. In addition, backgrounds (such as gamma rays and cosmic rays) may be rejected since they typically pass through multiple sets of planar electrodes 2414 and trigger multiple sets of wire grids 2415, whereas a low-energy neutron can trigger only one wire grid 2415, or a single wire, due to the very short range of the neutron-capture product ions. Therefore, events in which multiple wire grids 2415 are triggered at once may be ascribed to gamma rays or backgrounds.

Figure 25:
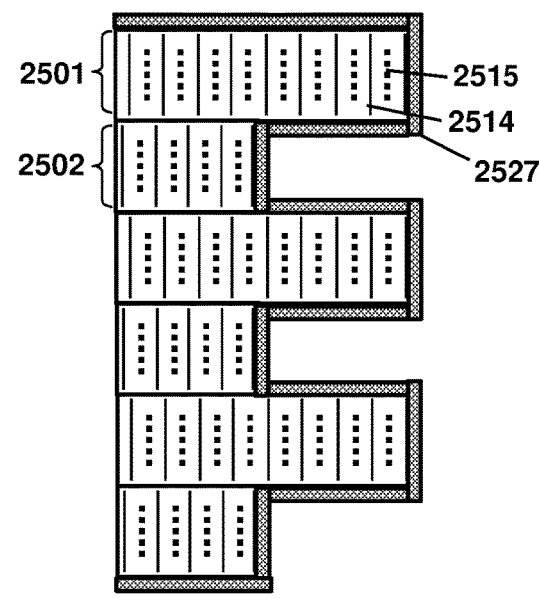
FIG. 25 is a cross-section sketch of an exemplary module of a detector array for detecting broad-spectrum neutrons with increased efficiency, according to some embodiments.

FIG. 25 is a cross-section sketch of a portion of an exemplary detector array for detecting neutrons across a wide range of energies, with frontward and rearward detectors 2501-2502 that include multiple wire grids 2515 and planar electrodes 2514 with layers of neutron-capture nuclides. Hydrogenous moderator slabs 2527 may be mounted around each detector 2501-2502 to moderate incoming neutrons.

Figure 26:
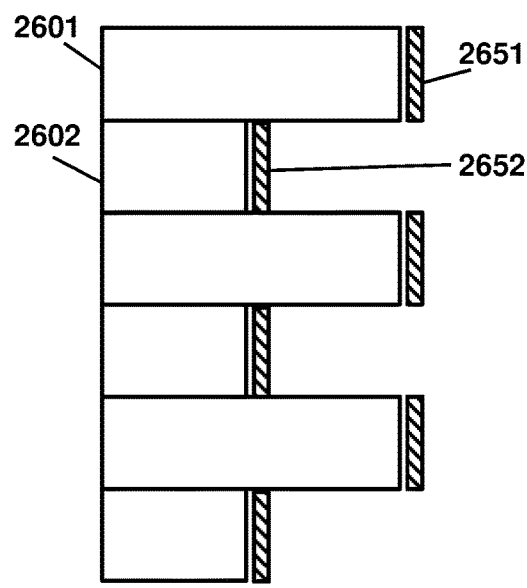
FIG. 26 is a cross-section sketch of an exemplary module of a detector array for detecting two particle types, according to some embodiments.

FIG. 26 is a cross-section sketch of a portion of an exemplary detector array for detecting two different particle types, or two different particle energy ranges. The detector array includes frontward and rearward detectors 2601-2602 capped on the front surface by additional particle detectors termed "counters" herein, with frontward counters 2651 capping the frontward detectors 2601 and rearward counters 2652 capping the rearward detectors 2602. In some embodiments, the frontward and rearward detectors 2601-2602 may be configured to detect one type of particle, while the frontward and rearward counters 2651-2652 may be configured to detect a different type of particle. For example, the frontward and rearward detectors 2601-2602 may be configured to detect gamma rays using plastic scintillators, while the counters 2651-2652 may be configured to detect neutrons using semiconductor junctions coated with a thin neutron-capture layer. The gamma rays may pass through the semiconductor counters 2651-2652 with little or no absorption, and can be detected in the detectors 2601-2602. In some embodiments, the counters 2651-2652 are thinner than the detectors 2601-2602 to minimize absorption or scattering of the particles that the detectors 2601-2602 are intended to detect. In some embodiments, the thickness of the counters 2651-2652 is at most 5% or 10% or 20% or 50% of the thickness of the detectors 2601-2602, wherein the thickness of the counters 2651-2652 is measured in the longitudinal direction and the thickness of the detectors 2601-2602 is measured laterally.

In an alternative embodiment, the frontward and rearward detectors 2601-2602 may be configured to detect high-energy neutrons by proton recoil in a PMMA matrix with ZnS scintillator beads, while the counters 2651-2652 may detect gamma rays in BGO scintillator. The BGO counters 2651-2652 may be thin enough that incoming neutrons may pass through them unscattered. Thus, the particles that the detectors 2601-2602 are intended to detect may pass through the counters 2651-2652 with minimal interaction. A processor may be configured to determine a first source location according to a detection peak among the rearward detectors 2602, and also to localize a second source according to a second detection peak among the rearward counters 2652, thereby detecting and localizing two different sources, or alternatively detecting the same source in two different ways, depending on the application needs.

Figure 27:
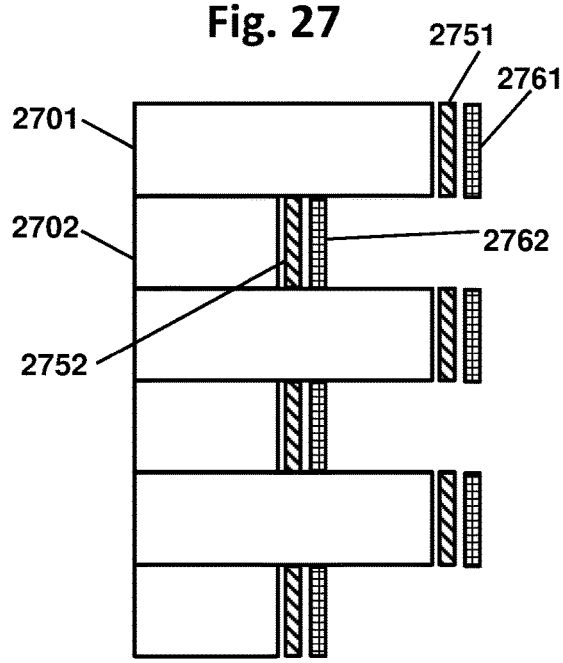
FIG. 27 is a cross-section sketch of an exemplary module of a detector array for detecting three particle types, according to some embodiments.

FIG. 27 is a cross-section sketch of a portion of an exemplary detector array for detecting three particle types, such as high-energy neutrons, low-energy neutrons, and gamma rays. In some embodiments, the array may include frontward and rearward detectors 2701-2702, capped by a first frontward and rearward counter 2751-2752, plus a second frontward and rearward counter 2761-2762 stacked as shown. Each detector type may be configured to detect one of the particle types listed. For example, the frontward and rearward detectors 2701-2702 may be gaseous ionization detectors configured to detect high-energy neutrons by proton recoil using planar electrodes of thin hydrogenous material. The first counters 2751-2752 may be a thin, high-density scintillator such as $CdWO_4$ configured to detect gamma rays. The second counters 2761-2762 may be thin lithium-glass or boron-glass scintillator configured to detect low-energy neutrons. The second counters 2761-2762 may be thin enough to pass most or substantially all of the particles that the detectors 2701-2702 are intended to detect, and to pass most or substantially all of the particles that the first counters 2751-2752 are intended to detect. The first counters 2751-2752 may be thin enough to pass most or substantially all of the particles that the detectors 2701-2702 are intended to detect. The processor may be configured to localize a first source according to a detection peak in the rearward first counters 2752, and a second source according to a detection peak in the rearward second counters 2762, and a third source according to a detection peak in the rearward detectors 2702, using methods described above. Alternatively, the signals from one set of detectors or counters may provide a measure of the background, while the other two sets of detectors or counters may be configured to detect radiological weapons (with gamma rays) and nuclear weapons (with neutrons) respectively. If a threat is detected in one set of detectors or counters, confirmatory results from the other detectors or counters may greatly reduce false alarms as well as speed up the source detection and localization process.

Figure 28:
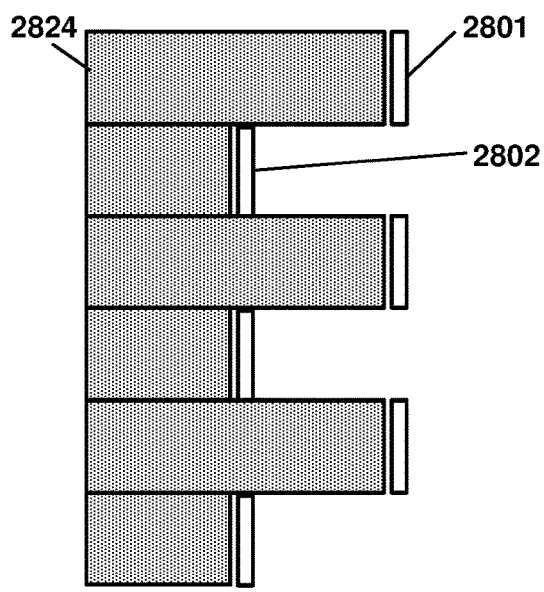
FIG. 28 is a cross-section sketch of an exemplary module of a detector array with shielding and slab-shaped detectors, according to some embodiments.

FIG. 28 is a cross-section sketch of a portion of an exemplary single-sided detector array in which the frontward and rearward detectors 2801-2802 may be thin slabs positioned frontward of prism-shaped shields 2824 (stipple). The shields 2824 may be shaped to collimate incoming particles from various directions, thereby adding to the collimation provided by the frontward detectors 2801, and thereby causing the rearward detectors 2802 to have a narrow detection peak. The frontward detectors 2801, being uncollimated, may have a wide detection distribution determined by the geometrical area of each frontward detector 2801 as viewed by the source.

The depicted detector array may be economical since shielding material may be less costly than detector material. For example, to detect high-energy and low-energy neutrons, the frontward and rearward detectors 2801-2802 may be scintillators or semiconductor detectors which generally have a high volumetric cost, whereas the shields 2824 may include low-cost lithiated polyethylene, for example. For further cost and weight savings, the shields 2824 may be hollow shells of material that effectively blocks the particles, such as a hollow prism shape of borated HDPE or a thin shell of cadmium to block neutrons, or a hollow bismuth or tungsten box to block gamma rays.

Figure 29:
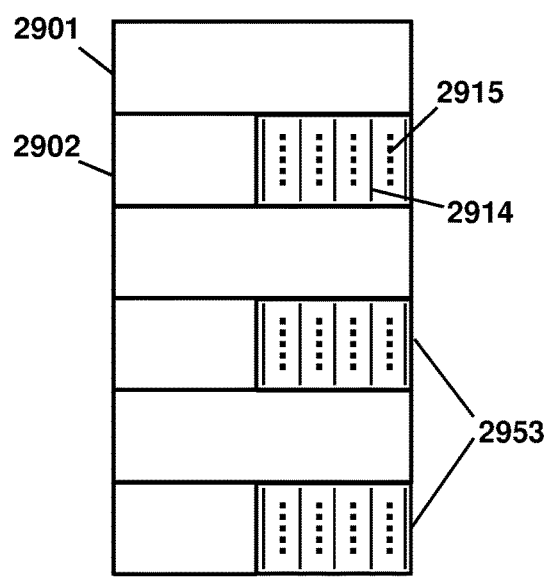
FIG. 29 is a cross-section sketch of an exemplary module of a detector array for detecting neutrons and gamma rays, according to some embodiments.

FIG. 29 is a cross-section sketch of a portion of an exemplary single-sided detector array for detecting two different particle types. Frontward and rearward detectors 2901-2902 may be as shown, while additional detectors 2953 may be mounted in the space in front of the rearward detectors 2902, thereby forming a compact assembly for detecting two different particle types. For example, the frontward and rearward detectors 2901-2902 may be scintillators configured to detect gamma rays, while the additional detectors 2953 may be gaseous ionization detectors with multiple layers of wire grids 2915 alternating with planar electrodes 2914 configured to detect low-energy neutrons by neutron capture. The additional detectors 2953 may be nearly transparent to the particles that the frontward and rearward detectors 2901-2902 are configured to detect, which in this case are gamma rays that readily pass through the thin, low-Z electrode materials of the additional detectors 2953.

Figure 30A:
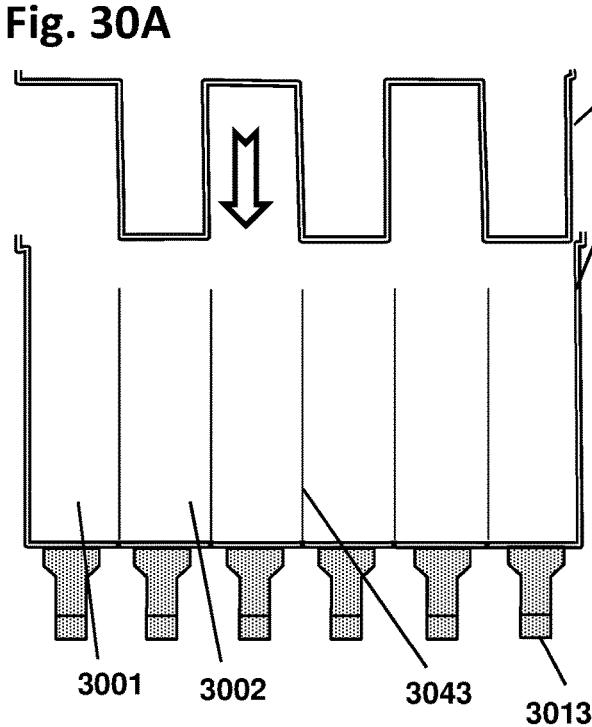
FIG. 30A is a cross-section sketch of an exemplary module of a detector array with liquid scintillator, according to some embodiments.

FIG. 30A is a notional assembly sketch of a portion of an exemplary detector array for detecting particles using a liquid scintillator. In some embodiments, the detector array may be configured to view upwards, for example to inspect a vehicle from below. Depicted is a lower case 3041 and an upper case 3042 that fit together, thereby forming the shapes of alternating frontward 3001 and rearward 3002 detector volumes in a single-sided configuration. When assembled and filled with liquid scintillator, the upper and lower cases 3041-3042 may thus form a low-cost multi-detector module. The full detector array may then be built up by combining a sufficient number of similar modules.

In some embodiments, the upper and lower cases 3041-3042 may be made from a transparent material, such as acrylic or carbonate or styrene or other type of polymer, or glass. Reflective baffles 3043 may be configured to optically separate the frontward and rearward detector volumes 3001-3002. The upper case 3042 may slide between the baffles 3043 in assembly, so that the light generated in each detector volume is prevented from passing into the adjacent detector volumes. Alternatively, the baffles 3043 may be attached to the upper case 3041 and configured to hang vertically, thereby forming a light-reflective wall between detectors. A light sensor 3013 such as a phototube or photodiode may view each detector volume 3001-3002.

In some embodiments, the liquid scintillator may be selected according to the type of particle that is to be detected. For example, for detecting gamma rays, the liquid scintillator may include a high-Z component and a fluor sensitive mainly to Compton electrons. To detect high-energy neutrons, the liquid scintillator may be hydrogenous such as mineral oil, with a fluor mainly sensitive to the heavily-ionizing recoil proton tracks. For detecting low-energy neutrons, the liquid may be hydrogen-free and contain a neutron-capture nuclide such as B or Li combined with ZnS beads or other scintillating beads. To detect multiple particle types with different pulse shapes, a PSD fluor may be used. The configuration shown may be economical since liquid scintillators are typically less costly than other types of scintillators, and since a multi-detector module may be assembled from pre-cast or heat-formed components, for example.

Figure 30B:
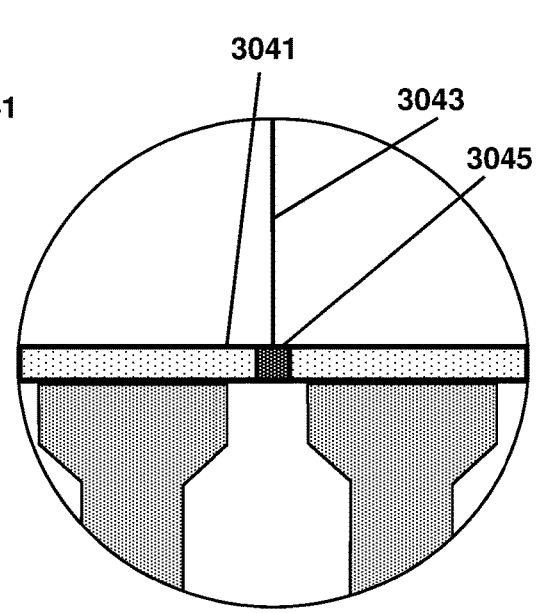
FIG. 30B is a magnified view showing an exemplary opaque segment, according to some embodiments.

FIG. 30B is a magnified view of a portion of the assembly of FIG. 30A, including the lower case 3041 and the reflective barrier 3043. An opaque segment 3045 is also shown embedded in the transparent lower case 3041 and configured to block light from traveling through the lower case 3041 between adjacent detectors.

Figure 31A:
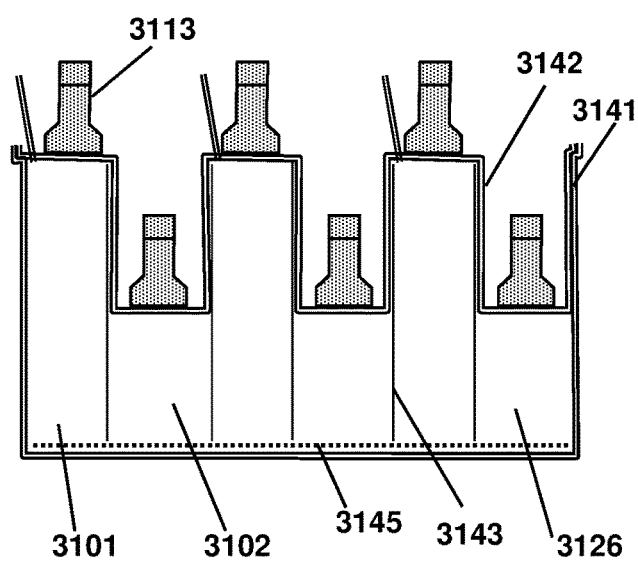
FIG. 31A is a cross-section sketch of an exemplary module of an alternative detector array with liquid scintillator, according to some embodiments.

FIG. 31A is a cross-section sketch of an exemplary detector array module similar to that of FIG. 30A, but now with light sensors 3113 on the top. An advantage of placing the light sensors 3113 on top may be improved access to the light sensors 3113 without having to remove the rest of the system. An upper case 3142 may fit into a lower case 3141 to form the shapes of frontward 3101 and rearward 3102 detector volumes that form a portion of a single-sided detector array when filled with a liquid scintillator 3126. Reflective baffles 3143 may optically separate the various detector volumes 3101-3102. An additional reflective surface 3145 may be placed on the lower case 3141 to reflect light toward the light sensors 3113. The depicted configuration includes features to control bubbles that may form against the upper case 3142. The uppermost surfaces of the upper case 3142 are shown slightly tilted so that bubbles that rise to the top will accumulate aside from the light sensors 3113, thereby avoiding light deflection by the bubbles.

Figure 31B:
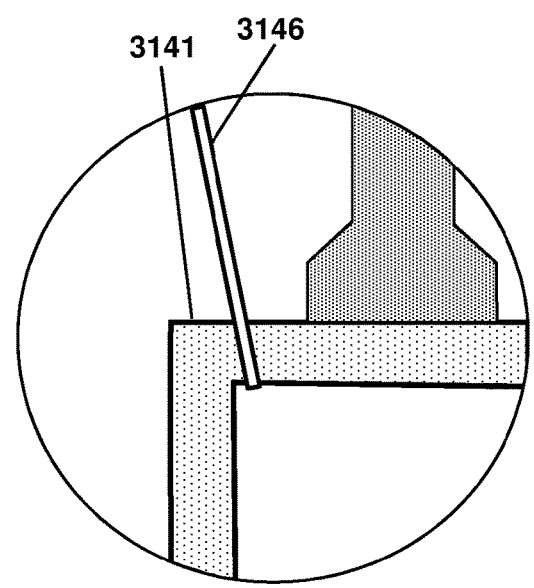
FIG. 31B is a magnified view showing an exemplary vent tube, according to some embodiments.

FIG. 31B is a magnified view of a portion of the upper case 3142 of FIG. 31A, showing a vent tube 3146 which may be provided to withdraw whatever gas may have evolved. The vent tube 3146 may also be used to control the hydrostatic pressure, to circulate and refill the liquid scintillator 3126, and other tasks.

Figure 32:
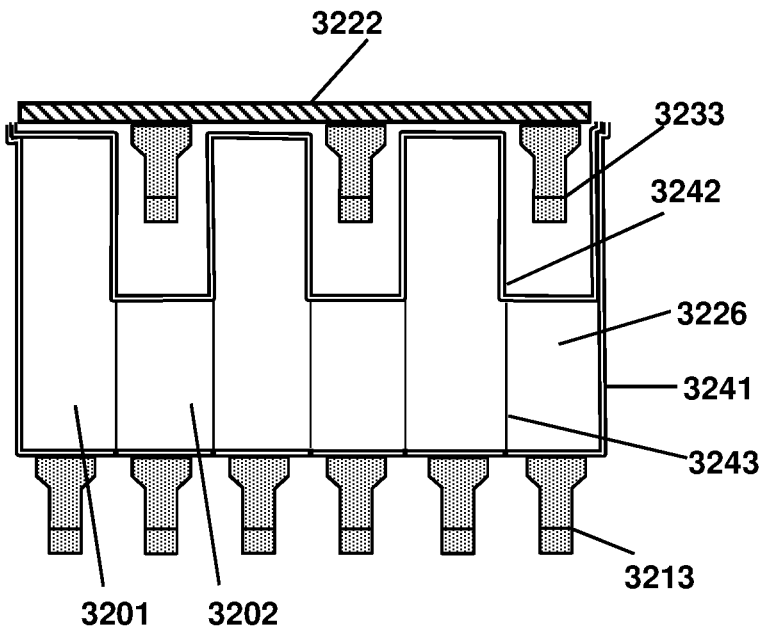
FIG. 32 is a cross-section sketch of an exemplary module of a detector array with liquid scintillator and a front planar detector, according to some embodiments.

FIG. 32 is a cross-section sketch of an exemplary detector array module similar to that of FIG. 30A, but now with an additional detector 3222 mounted in front (that is, above the upper case 3242). The lower case 3241 may be filled with liquid scintillator 3226 to form frontward 3201 and rearward 3202 detector volumes separated by reflective baffles 3243. Light sensors 3213 may be mounted under the lower case 3241 to view each detector volume 3201-3202, while additional light sensors 3233 may be mounted under the additional detector 3222 to view the additional detector 3222. The additional light sensors 3233 may sit in the empty spaces of the upper case 3242 above each rearward detector 3202 as shown. In some embodiments, the liquid scintillator 3226 may be configured to detect one type of particle while the additional detector 3222 may be configured to detect a different type of particle. For example, the liquid scintillator 3226 may include hydrogen and may detect gamma rays and recoil protons, while the additional detector 3222 may be a lithiated scintillator such as LiI to detect low-energy neutrons. Alternatively, the additional detector 3222 may include elpasolite such as CLYC, or other PSD scintillator containing a neutron-capture nuclide, and configured to detect gamma rays and neutron-capture events while producing different pulse shapes for each, and the liquid scintillator 3226 may include a hydrogenous proton-recoil target loaded with ZnS to detect high-energy neutrons. An advantage of placing the additional light sensors 3233 under the additional detector 3222 may be to allow the entire assembly to be mounted closer to an inspection region for increased detection efficiency.

Figure 33:
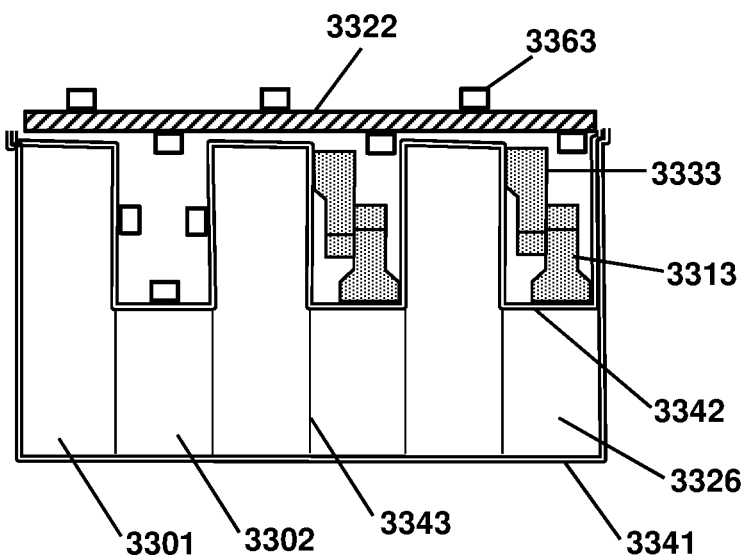
FIG. 33 is a cross-section sketch of an exemplary module of a detector array with liquid scintillator and a front planar detector and interior light sensors, according to some embodiments.

FIG. 33 is a cross-section sketch of an exemplary detector array module similar to that of FIG. 30A, but now with an additional detector 3322 and a compact arrangement of light sensors 3313, 3333, and 3363. An upper case 3342 fits into a lower case 3341 with reflective baffles 3343, and when filled with liquid scintillator 3326 forms a multi-detector module including volumes for frontward 3301 and rearward 3302 detectors as shown. For compactness, in some embodiments, a first set of light sensors 3313 may be provided within the open space in front of the rearward detectors 3302, while a second set of light sensors 3333 may be arranged in the same space to view the frontward detectors 3301. For example, the first set 3313 may be front-view phototubes coupled to the rearward detectors 3302, while the second set of light detectors 3333 may be side-view phototubes coupled to the sides of the frontward detectors 3301. Also shown are compact solid-state light sensors 3363 viewing the additional detector 3322 from above and/or below. As a further alternative, the phototube light sensors 3313-3333 may be replaced by further solid-state light sensors 3363 which may be installed in the same space as shown in the figure. An advantage of placing the various light sensors 3313, 3333, and/or 3363 in the open space may be to minimize the distance between the detector array and the inspection target, thereby maximizing the solid angle of the detector array.

Figure 34:
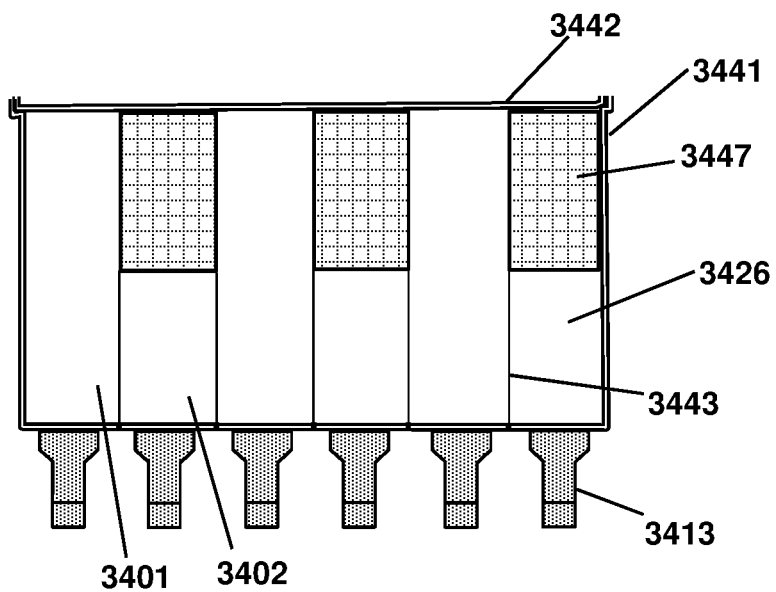
FIG. 34 is a cross-section sketch of an exemplary module of a detector array with liquid scintillator and foam spacers, according to some embodiments.

FIG. 34 is a cross-section sketch of an exemplary detector array module similar to that of FIG. 30A, but now with a flat upper case 3442 and prism-shaped spacers 3447. In some embodiments, the spacers 3447 may be a hollow box or a foam body or other material that is substantially transparent to the particles. Thus, the upper and lower cases 3441-3442, together with the spacers 3447 and reflective baffles 3443, may form the volumes and shapes of the frontward 3401 and rearward 3402 detectors when filled with liquid scintillator 3426 and viewed by light sensors 3413. An advantage of using spacers 3447 to produce the rearward detector 3402 volumes may be economy, since the flat upper case 3442 plus the spacers 3447 may be less costly than the shaped plastic parts described above. Another advantage may be versatility since the sizes and shapes of the various detectors 3401-3402 may be modified by simply changing the spacers 3447.

Figure 35:
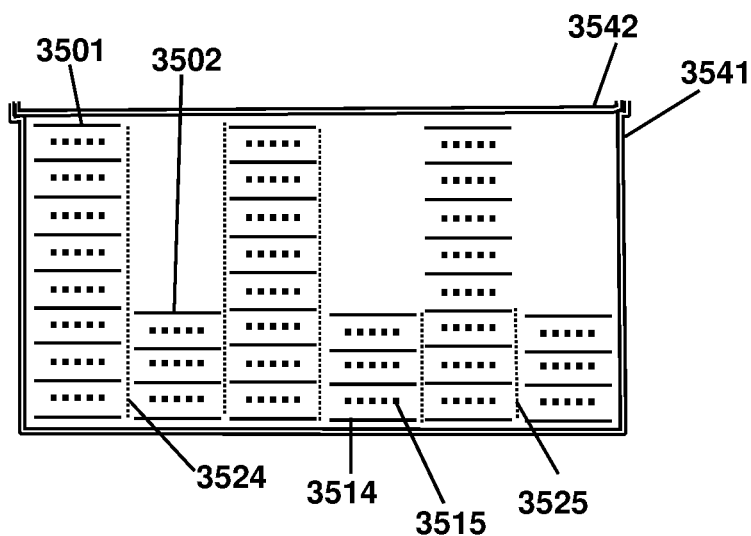
FIG. 35 is a cross-section sketch of an exemplary module of an alternative detector array with gaseous ionization detectors, according to some embodiments.

FIG. 35 is a cross-section sketch of an exemplary detector array module similar to that of FIG. 30A, but now using gaseous ionization type detection to detect low-energy neutrons. A flat upper case 3542 may fit into a lower case 3541 forming a gas-tight enclosure. Frontward 3501 and rearward 3502 detectors may be formed by stacking planar electrodes 3514 alternating with wire grids 3515 as shown. Each planar electrode 3514 may include a layer of neutron-capture material on both sides of a conducting foil, except for the outermost electrodes which may have neutron-capture material on only one side. The frontward detectors 3501 may serve as collimators by preventing low-energy neutrons from reaching the rearward detectors 3502 at various angles. In addition, a neutron absorber 3524, such as a cadmium film, may be included between the frontward and rearward detectors 3501-3502, thereby preventing low-energy neutrons from crossing between detectors. Alternatively, a short absorber 3525 may be provided, covering only the length of the rearward detectors 3502 as shown.

Figure 36:
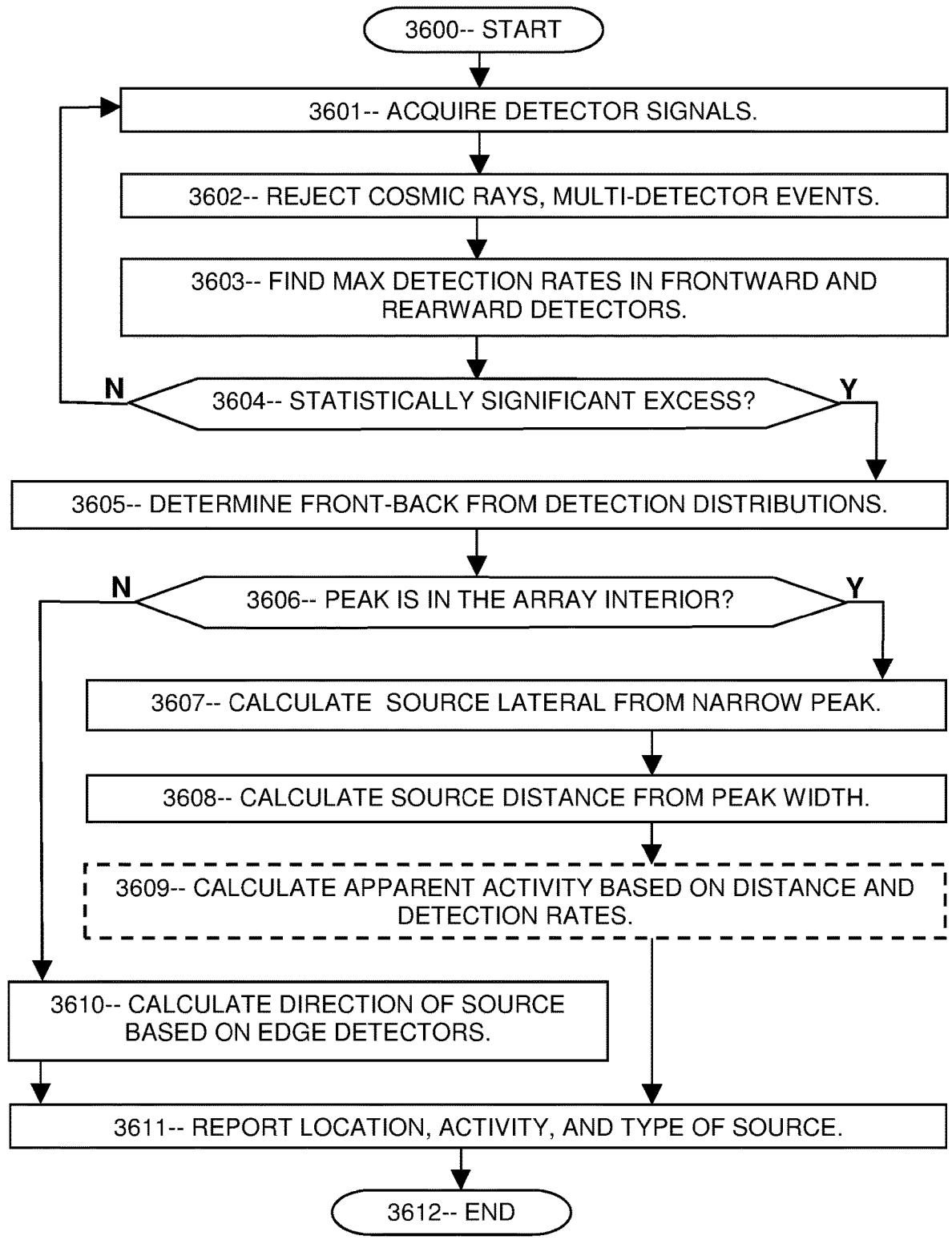
FIG. 36 is a flowchart of an exemplary method for calculating the location of a source in three dimensions, according to some embodiments.

FIG. 36 is a flowchart showing an exemplary method for determining source location parameters from detection data, according to some embodiments. The method starts 3600 with step 3601, in which detection signals may be acquired for a period of time from all the detectors including the frontward and rearward detectors. Background events such as cosmic rays may be rejected 3602 during acquisition or in subsequent event analysis. Data from the frontward and rearward detectors may be summed or otherwise processed to evaluate the total radiation dose 3603, and may be compared to the expected background level to determine whether a source is present 3604. If not, the flow may return to 3601. If a statistically significant excess detection is observed, then a source is likely present, and the front-vs-back location of the source may be determined by comparing detection distributions of frontward and rearward detectors 3605.

The location of the narrower peak (or alternatively the location of the detector with the highest counting rate) may then be checked to see if the peak is in the interior of the array or in one of the detectors on the edge of the array 3606. If the peak is in the interior of the array, then the lateral location of the source may then be determined according to the lateral position of the narrow detection peak 3607, and the distance to the source may be calculated according to the width of the detection peak 3608. Optionally 3609, the apparent activity (radiation outside of shielding that may be present) may be calculated according to the detection rates and the calculated distance.

If, at step 3606, the maximum detection rate occurs in one of the edge detectors, then the source is likely outside the direct field of view. In that case, the direction of the source can be determined from the detection rates of the various detectors on the outside edges of the array 3610. Finally, the source location and optionally the activity and type may be reported or displayed or transmitted or recorded 3611, after which the method ends at step 3612.

Figure 37:
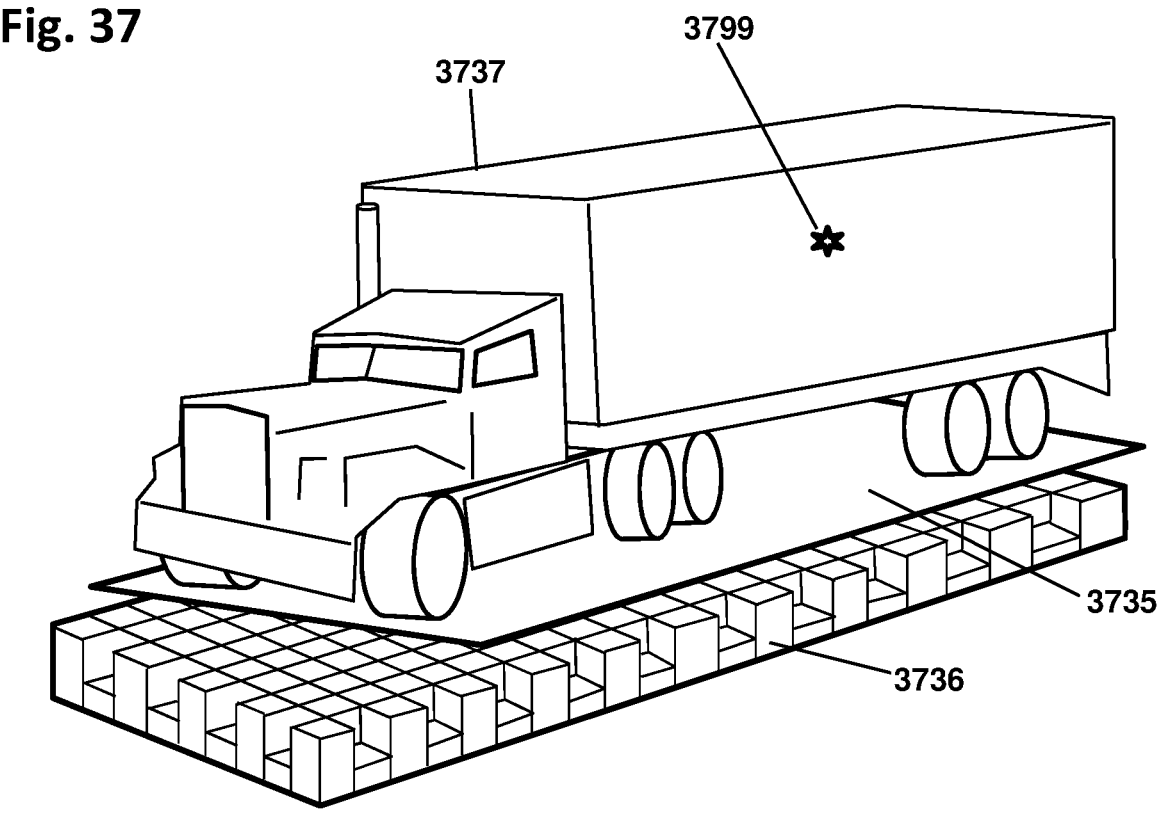
FIG. 37 is a perspective sketch of an exemplary detector array scanning a truck from below, according to some embodiments.

FIG. 37 is a notional perspective sketch of a truck 3737 being inspected by an exemplary detector array 3736 installed under the pavement 3735. The detector array 3736 reveals the presence and 3-D location of a concealed nuclear weapon 3799, as explained in the following figure.

Figure 38:
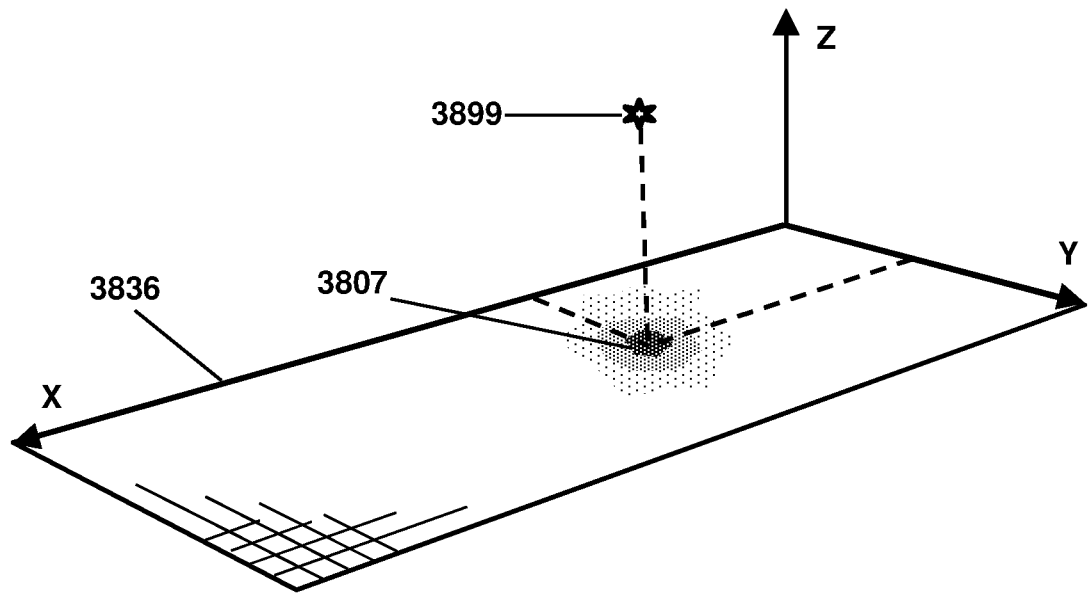
FIG. 38 is a perspective sketch showing the measurement parameters for FIG. 37, according to some embodiments.

FIG. 38 is a graphical analysis of the inspection of FIG. 37. Detection data of the detector array 3836 are shown in the X-Y plane, detecting radiation from the weapon 3899. A narrow detection peak 3807 is observed, thereby determining the X-Y location of the weapon 3799. The Z location, or source distance, of the weapon 3799 may be determined according to the peak width using a correlation function. The location of the weapon 3899 is thereby determined in three dimensions by the detection data.

Figure 39:
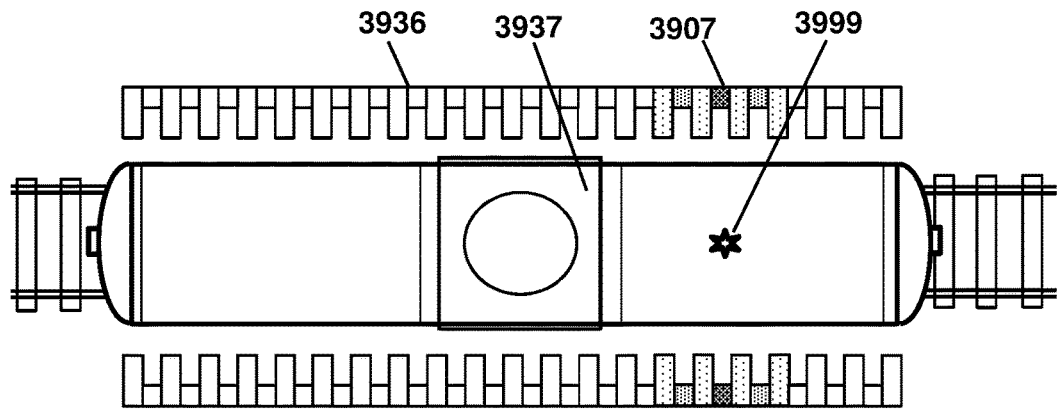
FIG. 39 is a top view sketch of an exemplary detector array scanning a railroad tank car from both sides, according to some embodiments.

FIG. 39 is a top view of a railroad tank car 3937 filled with oil, and being inspected by two exemplary detector arrays 3936 from both sides. An adversary has immersed a bomb 3999 in the oil, intending to suppress the neutron signature by neutron moderation and capture in the hydrogenous oil. Indeed, all of the low-to-moderate energy neutrons below about 2-3 MeV are thermalized and captured in the oil. However, a percentage of the gamma rays can escape, and some of the high-energy (5-10 MeV) neutrons can escape, due to the lower scattering cross-sections of high-energy neutrons. The depicted arrays have large solid angles and high detection efficiency, and therefore can detect the few escaping particles which produce a narrow detection peak 3907, thereby triggering an alarm indicating that the bomb 3999 is present, and also indicating its position in the tank car 3937.

Figure 40:
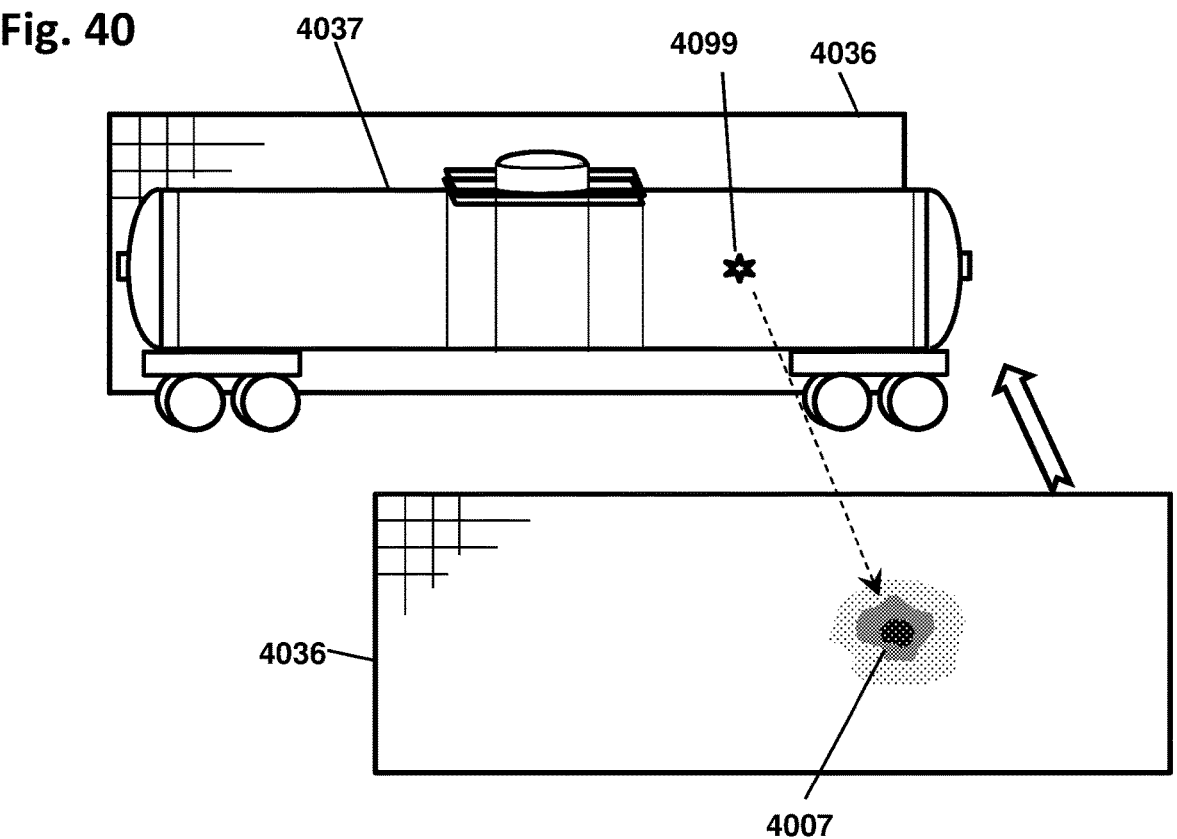
FIG. 40 is a perspective sketch of an exemplary detector array scanning a railroad tank car from both sides, according to some embodiments.

FIG. 40 is a perspective side view of the same scene as FIG. 39, with a tank car 4037 being inspected by two detector arrays 4036 (one array displaced for clarity). Also shown is a narrow detection peak 4007 in the detection array 4036, indicating the location of the bomb 4099.

Figure 41:
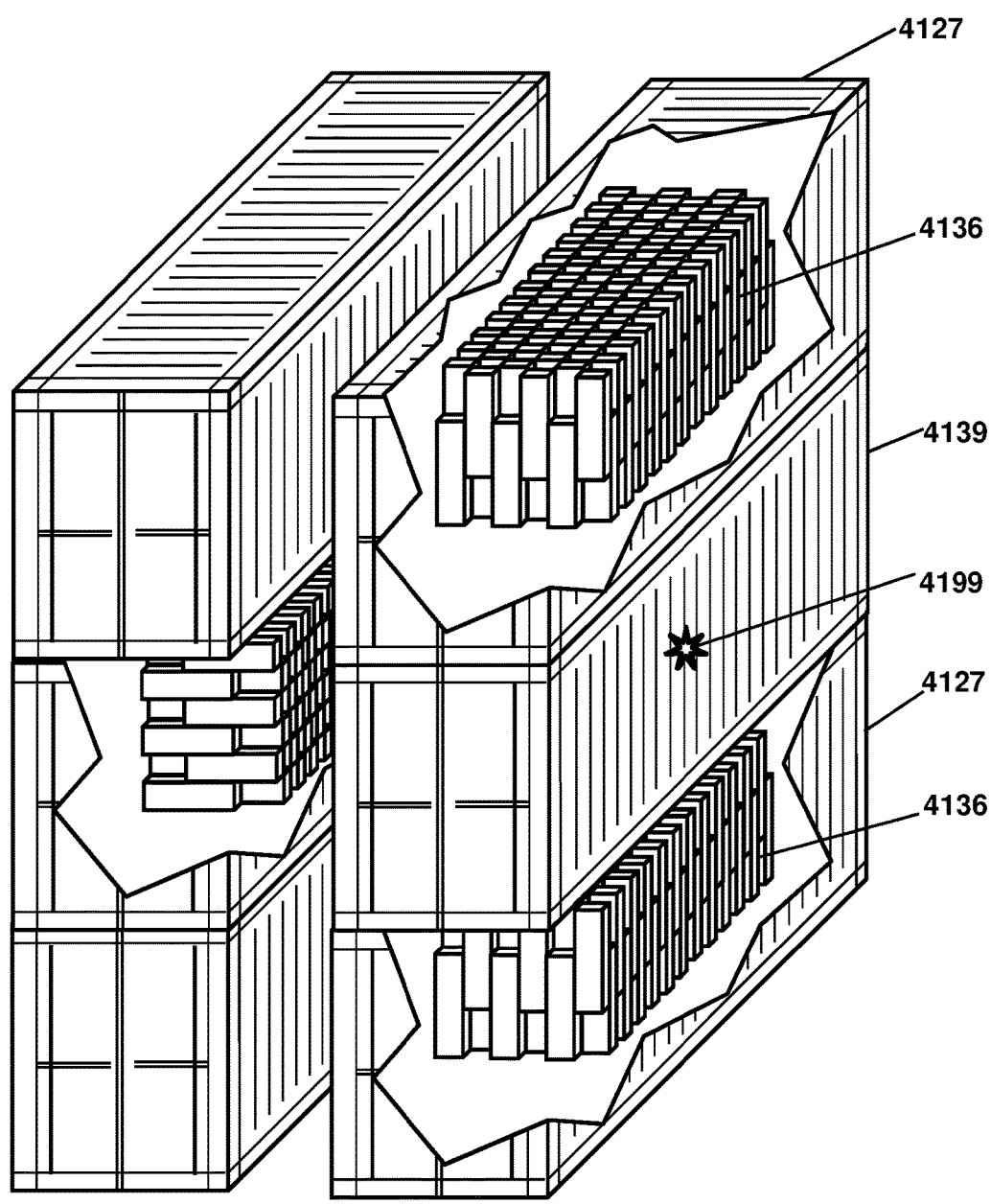
FIG. 41 is a perspective sketch of three exemplary detector arrays scanning a shipping container from three sides, according to some embodiments.

FIG. 41 is a perspective sketch, partially cut-away, of two stacks of intermodal shipping containers. One container 4139 is being inspected for contraband, and indeed it contains a well-shielded set of weapon components 4199. Due to the shielding, little radiation leaks out, so the threat was not detected during a brief entry scan when the container 4139 arrived at the shipping yard. A proper inspection may be performed with multiple large-area, high-efficiency, directional detectors. To do so, two inspection containers 4127 include double-sided detector arrays 4136 according to the present disclosure, and are stacked above and below the suspicious container 4139 for the duration of time that it remains in the shipping yard (typically several hours to days) which is generally sufficient time to detect even a well-shielded threat 4199. Optionally, other inspection containers may be positioned beside the suspect container 4139 with horizontally-mounted detector arrays as shown. To avoid running power cables around a busy shipping port, each inspection container 4127 may contain a rechargeable battery capable of powering the detector array 4136 for the duration of the scan.

Figure 42:
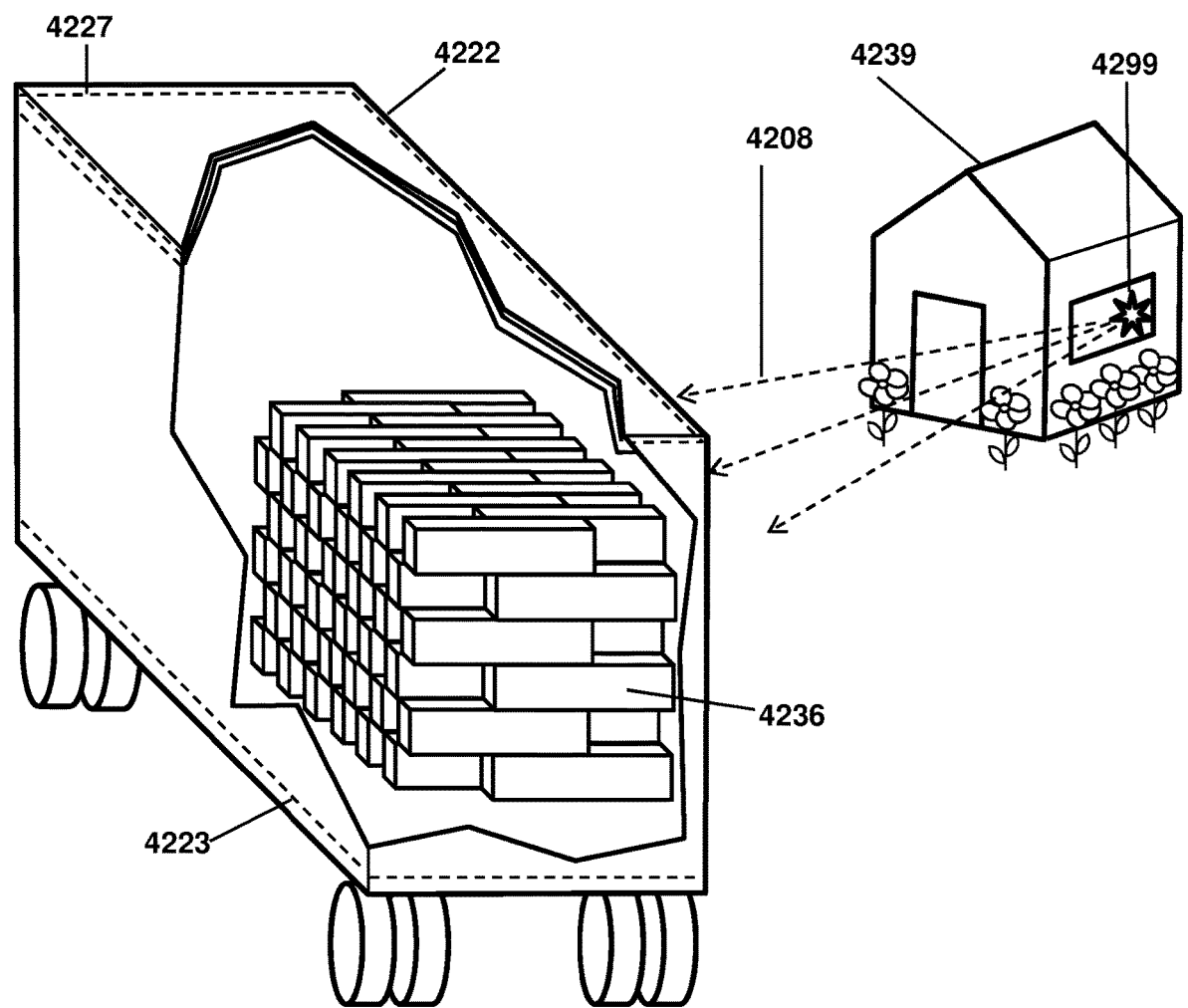
FIG. 42 is a perspective sketch of an exemplary detector array mounted in a truck and scanning the environment, according to some embodiments.

FIG. 42 is a perspective sketch, partially cut-away, of a mobile scanner comprising a trailer 4227 or other vehicle, containing an exemplary detector array 4236 which in this case is double-sided to allow source localization on both sides of the scanner 4227. The scanner 4227 is driven around an area searching for signs of a hidden weapon. In this case, the scanner 4227 detects particles 4208 coming from an innocent-looking little house 4239, which an adversary has used to conceal a nuclear weapon 4299. As the scanner 4227 slowly drives past the threat 4299, a detection peak moves from one edge of the array 4236, across the interior detectors, then to the opposite edge as the angle of the threat 4299 changes relative to the detector array 4236. The clandestine weapon 4299 is thereby revealed and localized. As an option, the scanner 4227 may include a scintillator on the top 4222 and bottom 4223 of the trailer 4227 to veto or reject cosmic rays.

Figure 43:
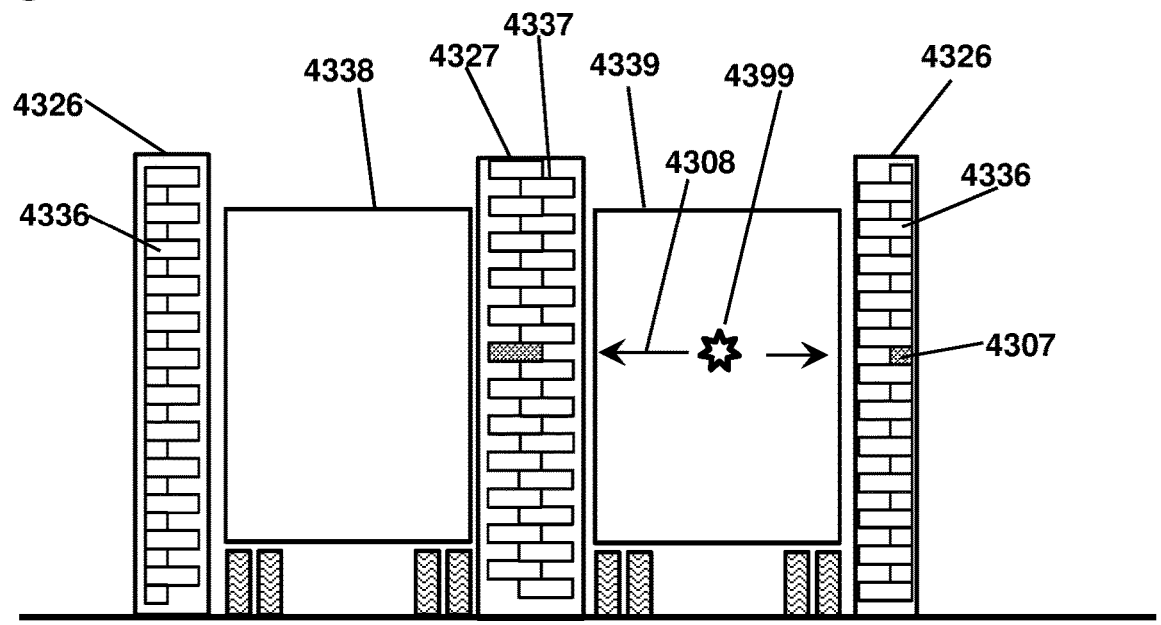
FIG. 43 is a cross-section sketch of exemplary detector arrays scanning two trucks from both sides, according to some embodiments.

FIG. 43 is a sketch of a two-lane vehicle inspection station featuring exemplary embodiments of the single-sided and double-sided detector arrays. Two trucks 4338 and 4339 are being tested for radiation by single-sided detector arrays 4336 in enclosures 4326, and a double-sided detector array 4337 in a central enclosure 4327. The left truck 4338 is clean, but the right truck 4339 contains a shielded radiological weapon 4399. Despite the shielding, a few particles 4308 escape and are detected in the detector arrays 4336-4337, producing narrow detection peaks 4307. In this way the detector arrays 4336-4337 can scan multiple vehicles simultaneously, with large solid angles and high efficiency, resulting in improved detection of clandestine radioactive material and increased border security.

Figure 44:
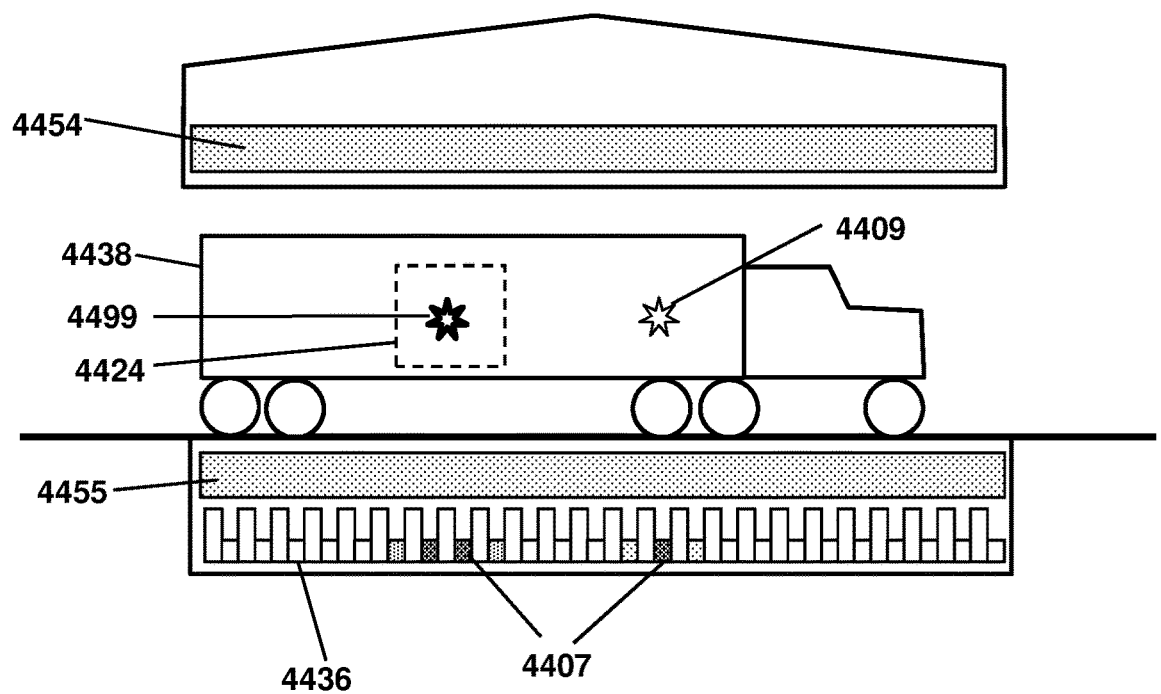
FIG. 44 is an elevation sketch of a vehicle inspection station with two inspection modes, according to some embodiments.

FIG. 44 is a sketch of an inspection station configured to detect weapon materials in two different ways. First, a pair of cosmic ray tracking chambers 4454 and 4455 are positioned above and below a truck 4438 being inspected. The tracking chambers 4454-4455 are configured to precisely measure the directions of tracks from cosmic rays that continually rain down from the sky. Cosmic rays (mainly GeV-range muons) easily pass through meters of ordinary materials without effect. But upon encountering the high-Z nuclei of a weapon, such as uranium or plutonium or the massive gamma shield around the weapon, the cosmic rays are scattered in a characteristic way. Thus, the tracking chambers 4454-4455 can detect such scattering and reveal a hidden weapon. In addition, an upward-viewing single-sided detector array 4436 is provided below the lower tracking chamber 4455 to detect radiation from an inspection object. Since the detector array 4436 is below the lower tracking chamber 4455, the scattering caused by the detector array 4436 has no effect on the cosmic ray determination. Also, the tracking chamber 4455 is generally made of thin, low-Z materials without hydrogen, and therefore is nearly transparent to the radiation being detected. Thus, the two detection systems do not interfere with each other.

In the sketch, a truck 4438 is being inspected by both systems. The truck 4438 contains a nuclear weapon 4499 within a massive shield 4424. Also, an adversary has placed a benign, declared source 4409 elsewhere in the truck 4438 to obscure the radiation signature. Non-directional detectors may be unable to discern the threat 4499 with the benign source present 4409, but the detector array 4436, with its fine source-locating properties, correctly detects both the radiation leakage from the weapon 4499 and the declared source 4409, as indicated by two detection peaks 4407. This raises an alarm since two separate sources were seen. An advantage of combining the cosmic ray tracking system and the detector array system in this way may be that the combination eliminates shielding design options that an adversary may try to exploit. If the adversary increases the shielding to reduce the radiation leakage, the cosmic ray scattering signal is increased, and if the adversary trims the shielding to reduce the scattering, the radiation signal is increased.

Embodiments of the detector array described herein can provide many advantages over conventional detectors and can economically solve important security inspection problems. (a) The detector array can detect a source with high sensitivity, due to its large area and high intrinsic efficiency and absence of shields or external collimators, according to some embodiments. (b) The detector array can determine the front-versus-back position of the source and/or the lateral position of the source and/or the distance of the source and/or the direction of the source relative to the detector array, thereby localizing the source in three dimensions, according to some embodiments. (c) The detector array can scan trucks, cargo containers, railcars, airplanes, vans, cars, boats, and many other vehicles, and can localize nuclear materials and/or radiological weapons found, according to some embodiments. (d) The double-sided detector array can detect and localize sources both in front and behind the detector array, according to some embodiments. (e) The double-sided detector array can scan two vehicles or other inspection items simultaneously, while identifying which vehicle has a radioactive source, according to some embodiments. (d) The detector array can detect and localize a plurality of radioactive sources simultaneously, according to some embodiments. (e) The detector array can be combined with a cosmic ray scattering inspection system, thereby providing two contrasting detection modes for revealing nuclear materials, according to some embodiments. (f) The detector array can scan across a wide area and detect nuclear weapons in regions such as an urban environment, according to some embodiments. (g) The detector array can perform an extremely sensitive scan of shipping containers in longer, high-statistics scan periods, thereby detecting even a well-shielded weapon or portions thereof, according to some embodiments. (h) The detector array can be assembled from available detector types including gamma-blind neutron detectors, neutron-blind gamma detectors, ionization-dependent scintillators that separately detect both particles, gaseous ionization type detectors, and low-cost liquid scintillators, according to some embodiments.

The ability to localize a clandestine radioactive source rapidly is a key enabling factor in nuclear threat detection. Advanced radiation detection systems like those disclosed herein will be needed in the coming decades to protect innocent people from the threat of nuclear and radiological terrorism.

The embodiments and examples provided herein illustrate the principles of the invention and its practical application, thereby enabling one of ordinary skill in the art to best utilize the invention. Many other variations and modifications and other uses will become apparent to those skilled in the art, without departing from the scope of the invention, which is defined by the appended claims.

What is claimed is:

1. A detector array for locating a radioactive source, comprising:
   a two-dimensional array of detectors, each detector configured to emit signals upon detecting particles from the radioactive source, each detector being prism-shaped and oriented parallel to a central axis that runs centrally from the back to the front of the detector array, wherein said detectors are arranged in an interleaved two-dimensional pattern of frontward detectors and rearward detectors, wherein the front surface of each rearward detector is rearwardly offset from the front surface of one or more adjacent frontward detectors; and
   a processor configured to locate the radioactive source by receiving and analyzing the signals, and to compare a frontward detection peak to a rearward detection peak, wherein the frontward detection peak comprises a subset of the frontward detectors having enhanced particle detection, and the rearward detection peak comprises a subset of the rearward detectors having enhanced particle detection;
   wherein the processor is further configured to apply a peak-width correlation function that takes as input the width of the rearward detection peak, and provides as output the distance of the radioactive source from the front of the detector array, or that takes as input the width of the frontward detection peak, and provides as output the distance of the radioactive source from the rear of the detector array.

2. The detector array of claim 1, wherein the processor is further configured to determine a back-versus-front position of the radioactive source by comparing the frontward detection peak with the rearward detection peak.

3. The detector array of claim 1, wherein the processor is further configured to determine a lateral position of the radioactive source relative to the detector array according to a lateral position of the frontward detection peak or the rearward detection peak.

4. The detector array of claim 1, wherein the processor is further configured to determine a distance of the radioactive source from the detector array according to a width of the frontward detection peak or the rearward detection peak.

5. The detector array of claim 1, wherein the processor is further configured to determine that the radioactive source is in front of the detector array if the rearward detection peak is narrower than the frontward detection peak, and to determine that the radioactive source is in back of the detector array if the frontward detection peak is narrower than the rearward detection peak.

6. The detector array of claim 1, wherein the processor is further configured to determine, when the frontward or rearward detection peak is in a particular edgemost detector of the detector array, that the radioactive source is located in a direction according to the position of the particular edgemost detector.

7. The detector array of claim 1, wherein the processor is further configured to determine an angle of the radioactive source relative to the detector array by comparing a distribution of detections in the frontward detectors with a distribution of detections in the rearward detectors.

8. A method for locating a radioactive source comprising:
   providing a two-dimensional array of detectors, each detector being configured to detect particles from the radioactive source and responsively emit signals, the detector array comprising frontward detectors interleaved with rearward detectors, wherein a front surface of each frontward detector is frontwardly offset relative to a front surface of each adjacent rearward detector;
   determining a frontward detection peak comprising a subset of the frontward detectors having enhanced detection of the particles;
   determining a rearward detection peak comprising a subset of the rearward detectors having enhanced detection of the particles;
   determining a width of the frontward detection peak;
   determining a width of the rearward detection peak;
   determining a position of the radioactive source by comparing the width of the frontward detection peak to the width of the rearward detection peak; and
   applying a predetermined distance correlation function that relates the distance of the radioactive source to the width of whichever detection peak, of the frontward and rearward detection peaks, has a smaller width.

9. The method of claim 8, further comprising determining that the radioactive source is in front of the detector array when the width of the rearward detection peak is less than the width of the frontward detection peak, and determining that the radioactive source is behind the detector array when the width of the frontward detection peak is less than the width of the rearward detection peak.

10. The method of claim 8, further comprising determining a lateral position of the radioactive source according to a lateral position of whichever detection peak, of the frontward and rearward detection peaks, has a smaller width.

11. The method of claim 8, further comprising determining a distance of the radioactive source according to the width of whichever detection peak, of the frontward and rearward detection peaks, has a smaller width.

12. A method for locating a radioactive source comprising:
   providing a two-dimensional array of detectors, each detector being configured to detect particles from the radioactive source and responsively emit signals, the detector array comprising frontward detectors interleaved with rearward detectors, wherein a front surface of each frontward detector is frontwardly offset relative to a front surface of each adjacent rearward detector;
   determining a frontward detection peak comprising a subset of the frontward detectors having enhanced detection of the particles;
   determining a rearward detection peak comprising a subset of the rearward detectors having enhanced detection of the particles;
   determining a width of the frontward detection peak;
   determining a width of the rearward detection peak;
   determining a position of the radioactive source by comparing the width of the frontward detection peak to the width of the rearward detection peak; and
   determining a distance correlation function that relates the distance of the radioactive source to the width of the frontward or rearward detection peak by placing a radioactive test source sequentially at a plurality of distances from the detector array and, at each distance of the plurality of distances, determining the width of the frontward or rearward detection peak respectively.

\* \* \* \* \*